United States Patent
Enge et al.

(10) Patent No.: US 9,274,210 B2
(45) Date of Patent: Mar. 1, 2016

(54) INDOOR RADIO RANGING BASED ON A SUBSET OF SUBCARRIERS EMPLOYED BY ORTHOGONAL FREQUENCY DIVISION MULTIPLEXING (OFDM)

(71) Applicant: QUALCOMM Incorporated, San Diego, CA (US)

(72) Inventors: Per Enge, San Jose, CA (US); Lionel Jacques Garin, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/656,398

(22) Filed: Oct. 19, 2012

(65) Prior Publication Data
US 2014/0112375 A1 Apr. 24, 2014

(51) Int. Cl.
| | | |
|---|---|---|
| *H04K 1/10* | (2006.01) | |
| *G01S 5/14* | (2006.01) | |
| *G01S 13/87* | (2006.01) | |
| *H04L 27/26* | (2006.01) | |
| *G01S 11/08* | (2006.01) | |

(52) U.S. Cl.
CPC ............. *G01S 5/14* (2013.01); *G01S 13/876* (2013.01); *G01S 13/878* (2013.01); *H04L 27/2663* (2013.01); *H04L 27/2672* (2013.01); *G01S 11/08* (2013.01)

(58) Field of Classification Search
CPC .............. H04B 1/00; H04B 3/00; H04B 7/00; H04B 14/00; H04B 17/00; H04B 2001/00; H04B 2201/00; H04J 13/00; H04J 2013/00; H03K 7/00; H03K 9/00; H03L 7/00; H04L 1/00; H04L 5/00; H04L 7/00; H04L 25/00; H04L 27/00; H04L 2001/00; H04L 2007/00; H04L 2025/00; H04L 2027/00; H03M 5/00
See application file for complete search history.

(56) References Cited

U.S. PATENT DOCUMENTS

| | | | |
|---|---|---|---|
| 7,564,909 B2 | 7/2009 | Sung et al. | |
| 7,969,311 B2 | 6/2011 | Markhovsky et al. | |
| 8,004,460 B2 | 8/2011 | Shyr et al. | |
| 8,179,816 B1 | 5/2012 | Vaidyanathan et al. | |
| 8,279,116 B2 | 10/2012 | Duffett-Smith et al. | |
| 2006/0050625 A1* | 3/2006 | Krasner ........................ 370/208 |

(Continued)

FOREIGN PATENT DOCUMENTS

EP 2239913 A1 10/2010

OTHER PUBLICATIONS

International Search Report and Written Opinion—PCT/US2013/064850—ISA/EPO—Mar. 27, 2014.

*Primary Examiner* — Adolf Dsouza
(74) *Attorney, Agent, or Firm* — Silicon Valley Patent Group LLP

(57) ABSTRACT

Systems, apparatus and methods for determining a set of ranges from selected subcarriers of an OFDM signal sent between a receiver (e.g., first transceiver or a local receiver of a local unit at a first location) and a transmitter (e.g., second transceiver or remote transmitter of a remote unit at a second location) are presented. The set of ranges is ambiguous as to the correct range. Each range in this set of ambiguous ranges represents a possible range between the transmitter and the receiver. Range ambiguities may be resolved by using additional subcarriers from the OFDM signal and/or using a last know position of a receiver and/or finding ranges to two, three or more transmitters. The range may be used with other ranges to find a location estimate of the receiver.

46 Claims, 17 Drawing Sheets

(56) References Cited

U.S. PATENT DOCUMENTS

| | | |
|---|---|---|
| 2008/0108355 A1 | 5/2008 | Oleszcsuk |
| 2010/0149032 A1 | 6/2010 | Feller et al. |
| 2012/0040691 A1 | 2/2012 | Han et al. |
| 2013/0005403 A1* | 1/2013 | Kuwahara et al. ............ 455/561 |
| 2013/0310074 A1* | 11/2013 | Porzio Giusto ............ 455/456.1 |

* cited by examiner

INDOOR RADIO RANGING BASED ON A SUBSET OF SUBCARRIERS EMPLOYED BY ORTHOGONAL FREQUENCY DIVISION MULTIPLEXING (OFDM)

CROSS-REFERENCE TO RELATED APPLICATIONS

Not Applicable.

BACKGROUND

I. Field of the Invention

This disclosure relates generally to systems, apparatus and methods for wireless position estimation, and more particularly, to indoor ranging based on an auto-correlation of a subset of OFDM subcarriers.

II. Background

A mobile device may use GPS to find its current position and provide a good fix. In doors, however, GPS signals are blocked and good GPS fixes are unreliable or impossible. The mobile device may switch to internal sensors (e.g., from accelerometers, gyrometers and magnetometers) determine how far and in which direction the mobile device travelled from the last good fix. Alternatively, the mobile device may record RSSI and/or RTT measurements from nearby wireless access points (APs). The RSSI measurements may be used for ranging; however, the resulting ranges have a high degree of uncertainty of 50 to 100 feet. The RTT measurements provide a lower degree of uncertainty; however, the uncertainty may still be 10 to 50 feet. By estimating ranges to three or more APs, the mobile device may use trilateration to estimate its location but the degree of uncertainty remains.

What is needed is a way to determine a mobile device's range and position to a higher degree of accuracy.

BRIEF SUMMARY

Disclosed are systems, apparatus and methods for determining a set of ranges between a transmitter and a receiver. The set of ranges may be converted to a single unambiguous range by using additional subcarriers from the OFDM signal, using a last know position of a receiver at a first location (e.g., a local unit or a first transceiver) and/or finding ranges to two, three or more a transmitter (e.g., a remote units or a second transceiver or transceivers). The range may be processed with other ranges to find a location of the receiver.

According to some aspects, disclosed is a method for radio ranging based on orthogonal frequency division multiplexing (OFDM) subcarriers, the method comprising: receiving, at a first transceiver, a received OFDM signal from a second transceiver; selecting a subset of at least two OFDM subcarriers comprising less than a majority of the OFDM subcarriers; and auto-correlating the subset of at least two OFDM subcarriers of the received OFDM signal to provide an auto-correlation result having a beat frequency from the subset of at least two OFDM subcarriers, wherein the auto-correlation result comprises a plurality of possible ranges.

According to some aspects, disclosed is a mobile device for radio ranging based on orthogonal frequency division multiplexing (OFDM) subcarriers, the mobile device comprising: a first transceiver; and a processor coupled to the first transceiver, the processor configured to: receive, at the first transceiver, a received OFDM signal from a second transceiver; select a subset of at least two OFDM subcarriers comprising less than a majority of the OFDM subcarriers; and auto-correlate the subset of at least two OFDM subcarriers of the received OFDM signal to provide an auto-correlation result having a beat frequency from the subset of at least two OFDM subcarriers, wherein the auto-correlation result comprises a plurality of possible ranges.

According to some aspects, disclosed is a mobile device for radio ranging based on orthogonal frequency division multiplexing (OFDM) subcarriers, the mobile device comprising: means for receiving, at a first transceiver, a received OFDM signal from a second transceiver; means for selecting a subset of at least two OFDM subcarriers comprising less than a majority of the OFDM subcarriers; and means for auto-correlating the subset of at least two OFDM subcarriers of the received OFDM signal to provide an auto-correlation result having a beat frequency from the subset of at least two OFDM subcarriers, wherein the auto-correlation result comprises a plurality of possible ranges.

According to some aspects, disclosed is a non-volatile computer-readable storage medium including program code stored thereon for radio ranging based on orthogonal frequency division multiplexing (OFDM) subcarriers, the program code comprising code for: receiving, at a first transceiver, a received OFDM signal from a second transceiver; selecting a subset of at least two OFDM subcarriers comprising less than a majority of the OFDM subcarriers; and auto-correlating the subset of at least two OFDM subcarriers of the received OFDM signal to provide an auto-correlation result having a beat frequency from the subset of at least two OFDM subcarriers, wherein the auto-correlation result comprises a plurality of possible ranges.

According to some aspects, disclosed is a method for radio ranging based on orthogonal frequency division multiplexing (OFDM) subcarriers, the method comprising: receiving, at a first transceiver, a received OFDM signal from a second transceiver; selecting a subset of at least three OFDM subcarriers; and auto-correlating the subset of at least three OFDM subcarriers of the received OFDM signal to provide an auto-correlation result comprising a range.

According to some aspects, disclosed is a mobile device for radio ranging based on orthogonal frequency division multiplexing (OFDM) subcarriers, the mobile device comprising: a first transceiver; and a processor coupled to the first transceiver, the processor configured to: receive, at the first transceiver, a received OFDM signal from a second transceiver; select a subset of at least three OFDM subcarriers; and auto-correlate the subset of at least three OFDM subcarriers of the received OFDM signal to provide an auto-correlation result comprising a range.

According to some aspects, disclosed is a mobile device for radio ranging based on orthogonal frequency division multiplexing (OFDM) subcarriers, the mobile device comprising: means for receiving, at a first transceiver, a received OFDM signal from a second transceiver; means for selecting a subset of at least three OFDM subcarriers; and means for auto-correlating the subset of at least three OFDM subcarriers of the received OFDM signal to provide an auto-correlation result comprising a range.

According to some aspects, disclosed is a non-volatile computer-readable storage medium including program code stored thereon for radio ranging based on orthogonal frequency division multiplexing (OFDM) subcarriers, the program code comprising code for: receiving, at a first transceiver, a received OFDM signal from a second transceiver; selecting a subset of at least three OFDM subcarriers; and auto-correlating the subset of at least three OFDM subcarriers of the received OFDM signal to provide an auto-correlation result comprising a range.

It is understood that other aspects will become readily apparent to those skilled in the art from the following detailed description, wherein it is shown and described various aspects by way of illustration. The drawings and detailed description are to be regarded as illustrative in nature and not as restrictive.

BRIEF DESCRIPTION OF THE DRAWING

Embodiments of the invention will be described, by way of example only, with reference to the drawings.

DETAILED DESCRIPTION

Figure 1:
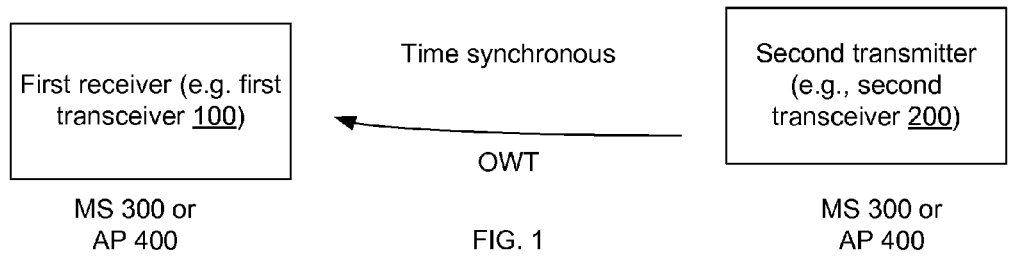
FIG. 1 shows a first receiver (e.g., a first transceiver or a local unit) at a first location and a second transmitter (e.g., a second transceiver or a remote unit) at a second location, synchronized to each other, where the first receiver captures an OFDM signal for producing a one-way travel time (OWTT).

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the disclosure.

Position determination techniques described herein may be implemented in conjunction with various wireless communication networks such as a wireless wide area network (WWAN), a wireless local area network (WLAN), a wireless personal area network (WPAN), and so on. The term "network" and "system" are often used interchangeably. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), and so on. A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may be an IEEE 802.11x network, and a WPAN may be a Bluetooth network, an IEEE 802.15x, or some other type of network. The techniques may also be implemented in conjunction with any combination of WWAN, WLAN and/or WPAN.

A satellite positioning system (SPS) typically includes a system of transmitters positioned to enable entities to determine their location on or above the Earth based, at least in part, on signals received from the transmitters. Such a transmitter typically transmits a signal marked with a repeating pseudo-random noise (PN) code of a set number of chips and may be located on ground based control stations, user equipment and/or space vehicles. In a particular example, such transmitters may be located on Earth orbiting satellite vehicles (SVs). For example, a SV in a constellation of Global Navigation Satellite System (GNSS) such as Global Positioning System (GPS), Galileo, GLONASS or Compass may transmit a signal marked with a PN code that is distinguishable from PN codes transmitted by other SVs in the constellation (e.g., using different PN codes for each satellite as in GPS or using the same code on different frequencies as in GLONASS). In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, Beidou over China, etc., and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

As used herein, a mobile device, sometimes referred to as a mobile station (MS) or user equipment (UE), such as a cellular phone, mobile phone or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile device."

The following disclosure relates to finding an accurate range by first finding a set of several (ambiguous) ranges between a base station or access point and a mobile device. One of the several ranges from the set is an accurate range measurement that we are seeking. The several ranges come from a result of an auto-correlation of two or more subcarriers from an OFDM signal.

RSSI (received signal strength indicator) ranging has been widely used but such RSSI ranging leaves too much uncertainty. Conventional RTT (round-trip time) ranging has less uncertainty than RSSI ranging but is still has too much uncertainty. Auto-correlation using a single subcarrier (shown in FIG. 4) results in a wide auto-correlation result (shown in FIG. 5) and a position estimate with too much uncertainty. Auto-correlation using all of the subcarriers (shown in FIG. 3) results in an auto-correlation result (shown in FIG. 10) with little uncertainty but requires all subcarriers of the entire OFDM signal be used for position location. Using all of the subcarriers for position location leaves significantly less capacity for user data and information.

Embodiments described herein resolve this ambiguity while still leaving most subcarriers for user data. Embodiments resolve this ambiguity in the auto-correlation result to determine a single range. Some embodiments compute a range based on an auto-correlation of two or more subcarriers of an OFDM signal. Typically, the range is determined between an access point and a mobile device, however, various combinations of access point and mobile device transceivers are possible (e.g., see FIGS. 15-20).

In some embodiments, a processor performs an auto-correlation using two subcarriers (e.g., see FIG. 6) having an auto-correlation result (e.g., see FIG. 7) with little uncertainty but ambiguity with various ranges (e.g., $R_1$, $R_2$, $R_3$, $R_4$, $R_5$ or $R_6$). The ambiguity may be solved though.

In some embodiments, a processor performs an auto-correlation using three subcarriers (e.g., see FIG. 8) results in an auto-correlation result (e.g., see FIG. 9) with little uncertainty and fewer ambiguities ($R_1$, $R_2$, $R_3$).

In some embodiments, a processor selects two or more subcarriers transmitting a known signal (e.g., pilot signal) or knowable signal (e.g., demodulated data). The processor performs an auto-correction with the selected subcarriers. Phase abnormalities introduced by filtering may be eliminated by selecting pairs of subcarriers equally spaced from center; therefore, these subcarriers having equal but opposite phase errors would cancel each other.

In some embodiments, a processor solves the ambiguity problem explained above in several ways: (1) trilateration (e.g., see FIG. 14) to find an intersection solution; (2) using a point on the range circle(s) closest to the last known position estimate (e.g., see FIGS. 11 and 13); (3) using three or more subcarriers (e.g., see FIGS. 8 and 9); and/or (4) limit a possible range by physical limitations of an indoor area (e.g., an access point provides serve to just a 50-foot radius so possible ranges are limited by this coverage area).

FIG. 1 shows a first receiver (e.g., a first transceiver 100 or a local unit) at a first location and a second transmitter (e.g., a second transceiver 200 or a remote unit) as a second location, synchronized to each other, where the first receiver captures an OFDM signal for producing a one-way travel time (OWTT). The first receiver and second transmitter are referenced to each other as "first" and "second" even though one unit includes a receiver and the other includes a transmitter for convenience sake. A system where the first receiver and the second transmitter are synchronized means there clocks are synchronized. The first receiver may include a both a receiver and a transmitter (e.g., a first transceiver 100) and may be a mobile device 300 or an access point 400. Similarly, the second transmitter may also include both a receiver and a transmitter (e.g., a second transceiver 200) and may be either a mobile device 300 or an access point 400. If the first receiver and the second transmitter are time synchronized, ranging may be performed by computing OWTT.

Figure 2:
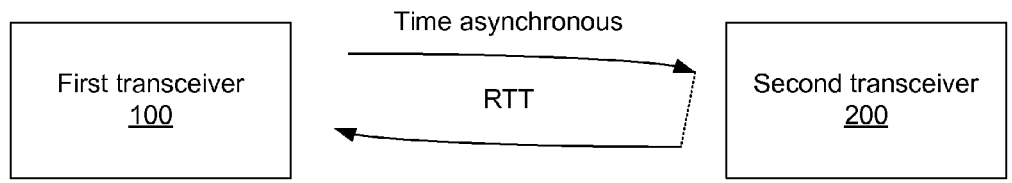
FIG. 2 shows a first transceiver (e.g., a local unit) at a first location and a second transceiver (e.g., a remote unit) at a second location to transmit and receive an OFDM signal for producing a round-trip time (RRT).

FIG. 2 shows a first transceiver 100 (e.g., a local unit) at a first location and a second transceiver 200 (e.g., a remote unit) at a second location to transmit and receive an OFDM signal for producing a round-trip time (RRT). Use of RTT is independent of either having synchronized clocks or asynchronous clocks. Again, the first transceiver 100 and the second transceiver 200 may respectable be two mobile devices 300, two access points 400, a mobile device 300 and an access point 400, or an access point 400 and a mobile device 300. Independent if the first transceiver 100 and the second transceiver 200 are time synchronized, ranging may be performed by computing RRT. That is, RRT may be using with a system that synchronous or asynchronous.

Figure 3:
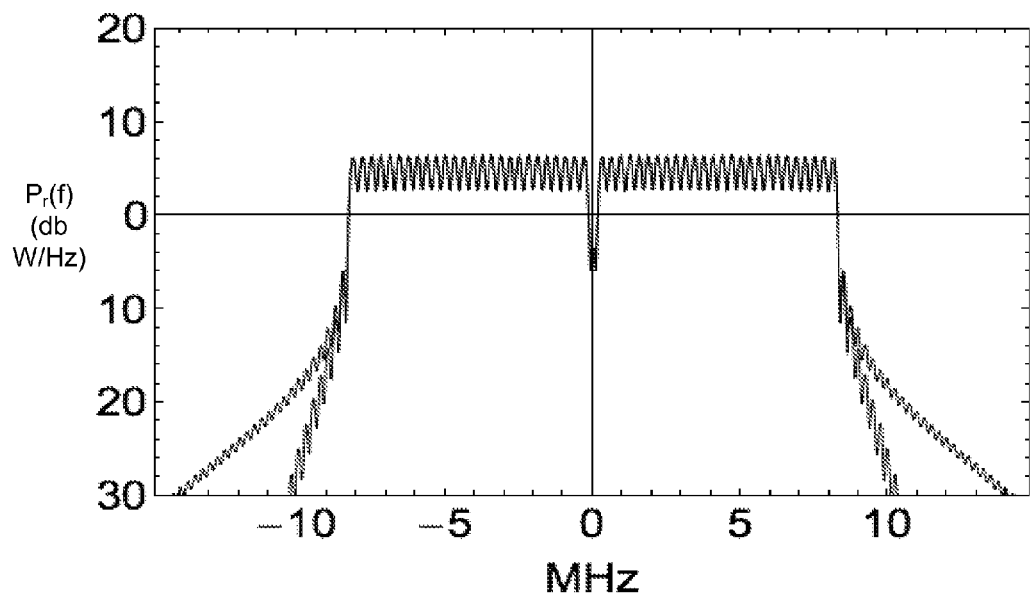
FIG. 3 shows an OFDM signal in the frequency domain.

FIG. 3 shows an OFDM signal in the frequency domain. An OFDM signal includes several subcarriers. The power spectral density (PSD) for the subcarriers is represented by $P_r(f)$ in units of db W/Hz (Decibels relative to 1 Watt per Hertz). An OFDM signal following the IEEE 802.11a/g standard includes a total of 64 subcarriers of which 4 are pilot signals for training and tracking, 48 carry user data, and 12 are guard subcarriers to lessen inter-symbol interference (ISI).

Figure 4:
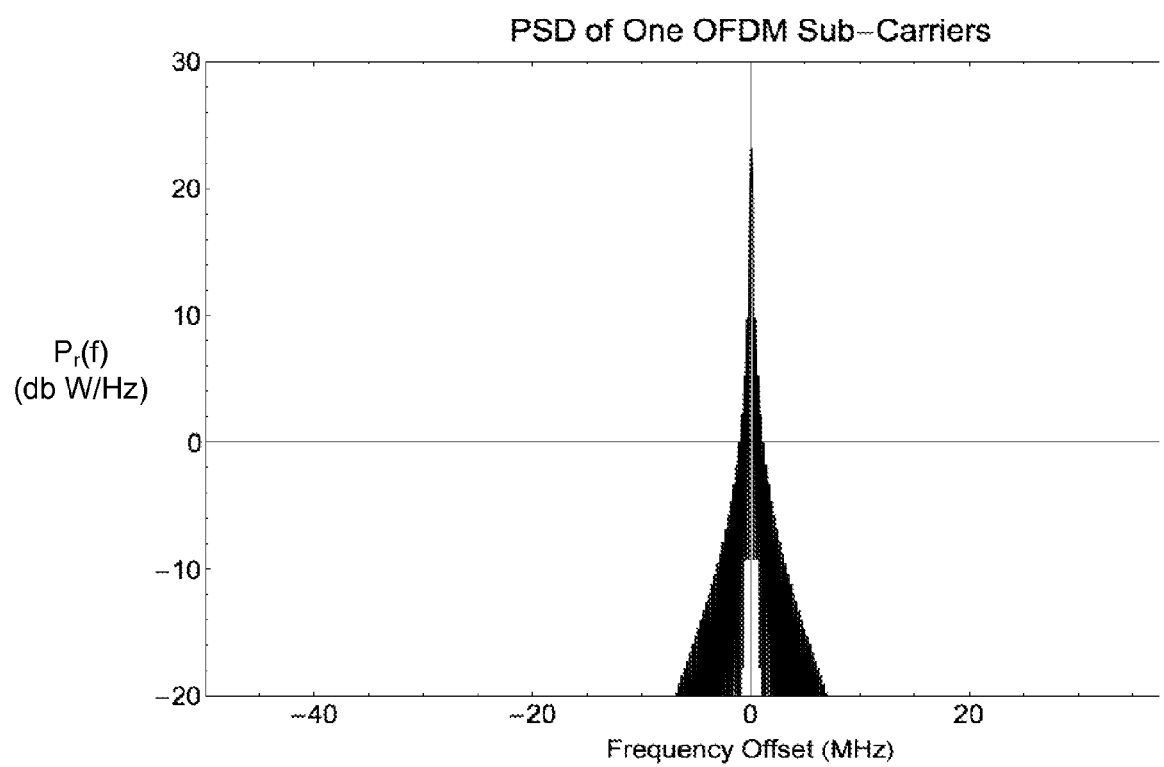
FIG. 4 shows a single subcarrier from an OFDM signal.
Figure 5:
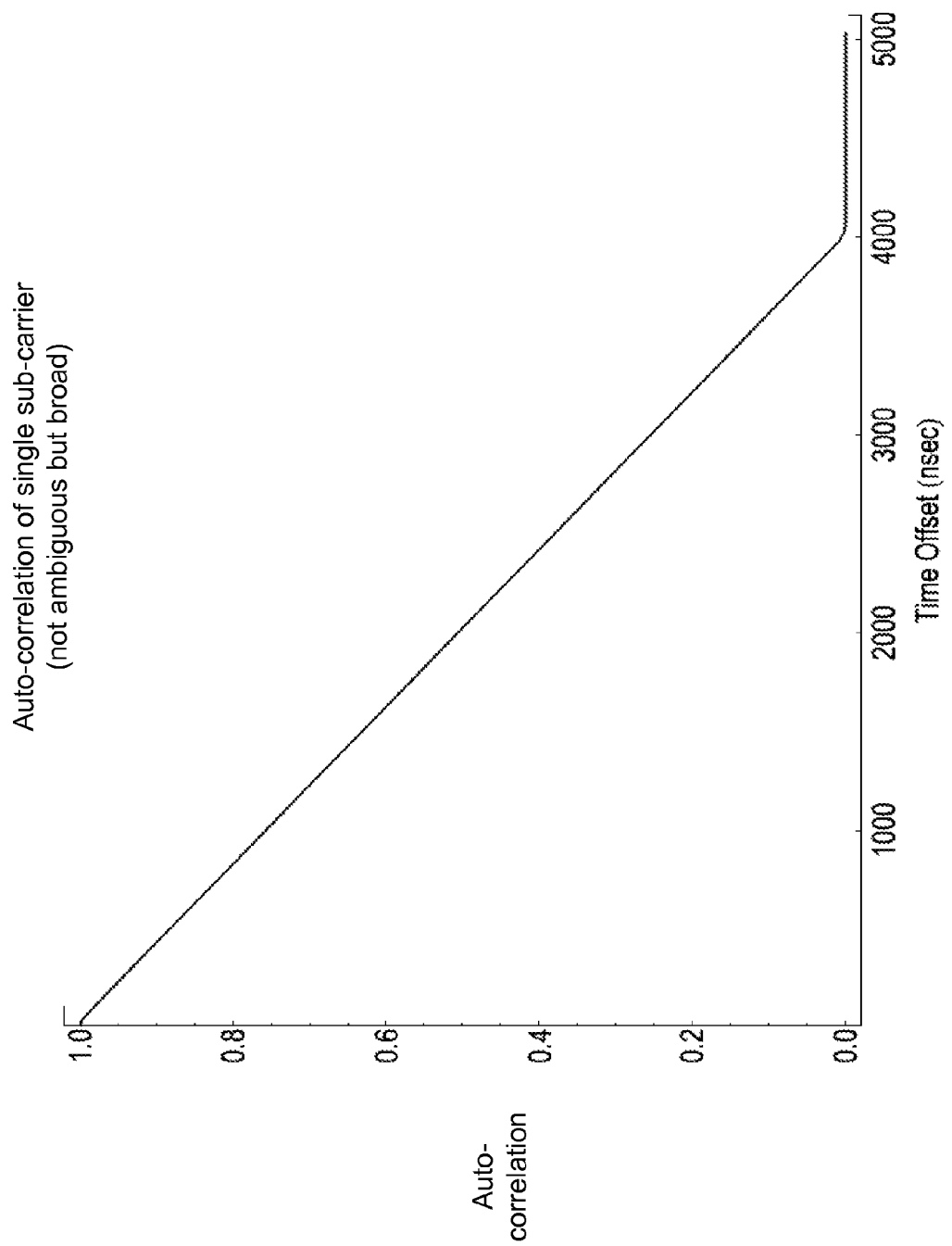
FIG. 5 shows result from an auto-correlation of a single subcarrier of an OFDM signal.

FIG. 4 shows a single subcarrier from an OFDM signal. The single subcarrier may be selected and applied to an auto-correlation unit to determine a range between a transmitter of the OFDM signal and a receiver. It is not significant where in the spectrum the single subcarrier is selected. An auto-correlation using a single subcarrier, however, results in a wide auto-correlation result and hence a position estimate with a large uncertainty. FIG. 5 shows result from an auto-correlation of a single subcarrier of an OFDM signal. The auto-correlation results in a wide triangle representing a time the OFDM signal was received. The wide triangle is not ambiguous (meaning that only one OFDM signal arrival time is found) but the triangle is broad (meaning that the ranging precision is poor). In the case shown, the OFDM signal was received at time '0' where a maximum auto-correlation value is found but the auto-correlation does not taper down to a magnitude of zero until approximately 4000 ns (nanoseconds).

Figure 6:
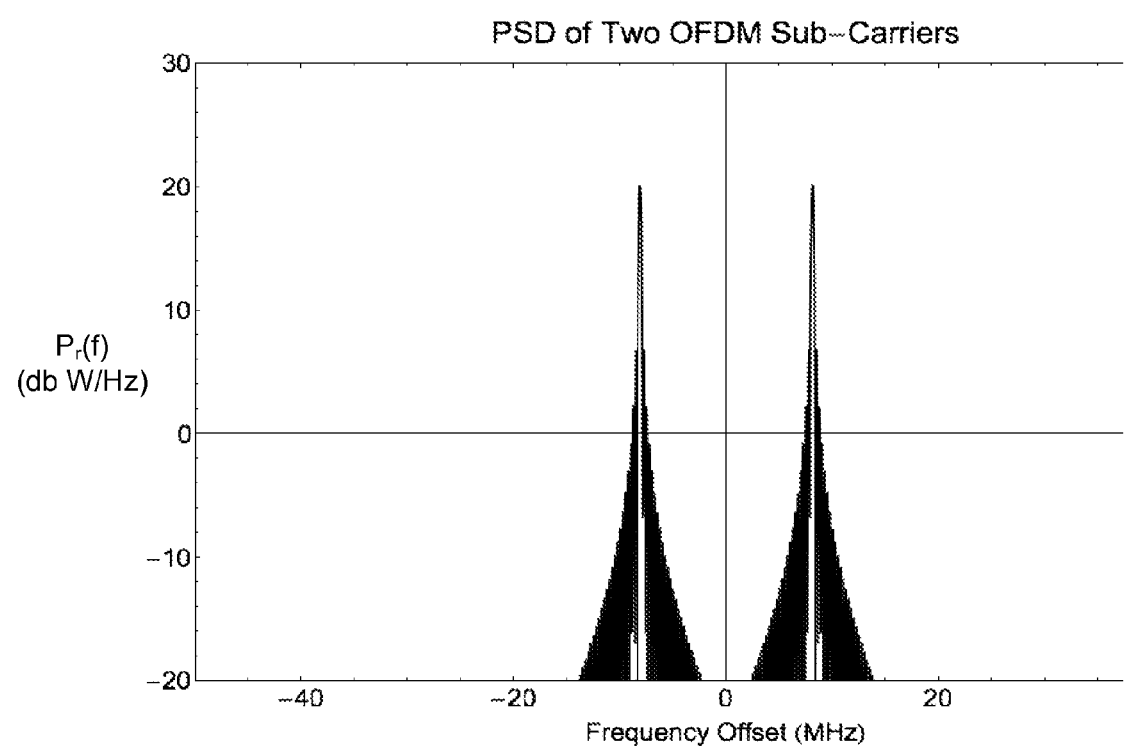
FIG. 6 shows a selection of two subcarriers from an OFDM signal, in accordance with some embodiments of the invention.

FIG. 6 shows a selection of two subcarriers from an OFDM signal, in accordance with some embodiments of the invention. Other subcarriers shown in FIG. 3 are present in the OFDM signal but not shown here for clarity. Again, the power spectral density (PSD) for the subcarriers is represented by $P_r(f)$ in units of db W/Hz. The two selected subcarriers may be selected at symmetrical locations about a center of the OFDM signal. The center of the OFDM signal is shown at 0 MHz for convenience. The two subcarriers may be pilot channels, known signals or knowable signals. The two subcarriers may be spaced apart at the upper end and the lower end (e.g., +8 MHz and −8 MHz) for the OFDM signal used by implementations of IEEE 802.11a/g/n. Some embodiments select a first subcarrier having a lowest useable frequency and a second subcarrier having a highest usable frequency.

Figure 7:
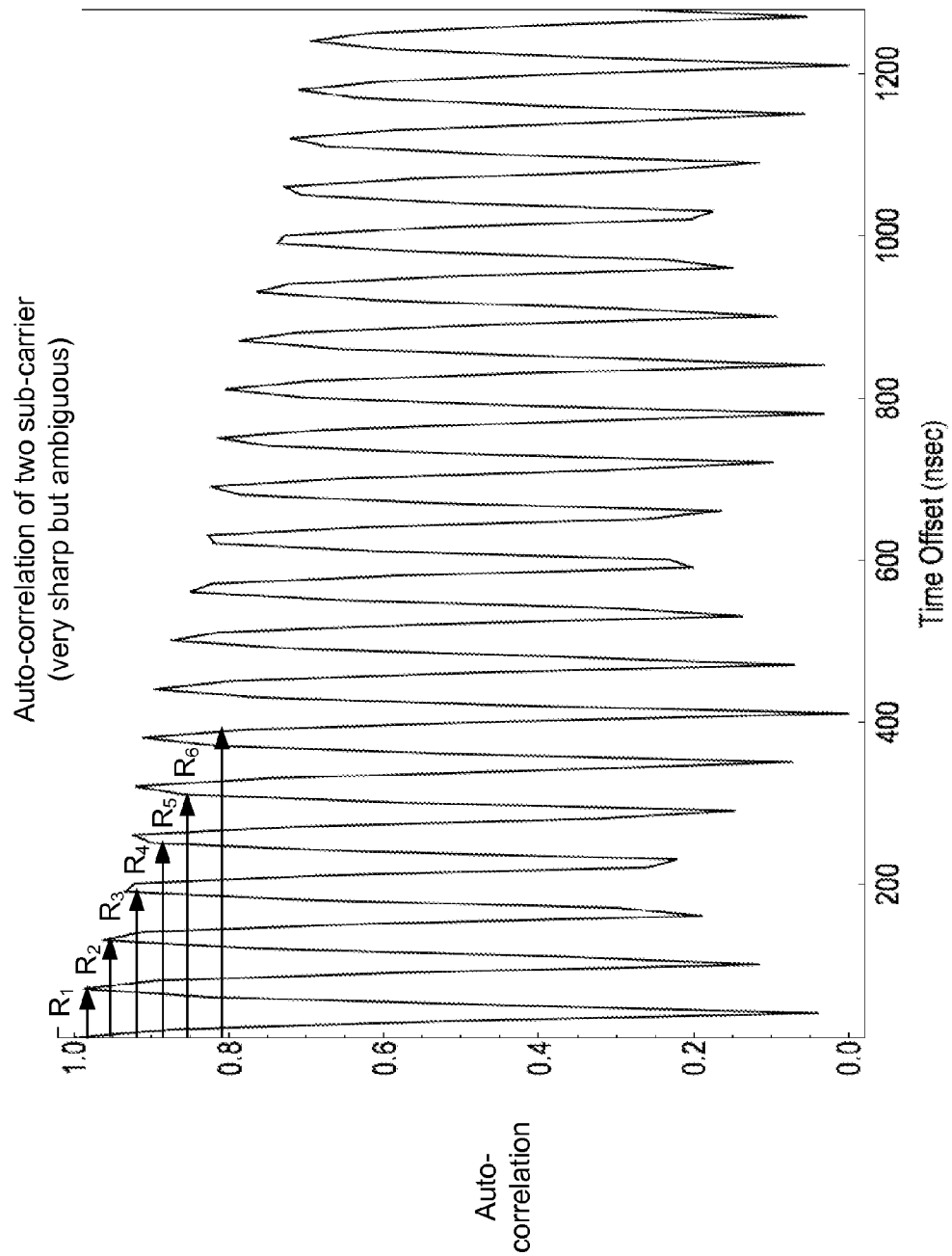
FIG. 7 shows result from an auto-correlation of two subcarriers of an OFDM signal, in accordance with some embodiments of the invention.

FIG. 7 shows result from an auto-correlation of two subcarriers of an OFDM signal, in accordance with some embodiments of the invention. The auto-correlation of two subcarriers supplies multiple peaks and each individual peak tapers off quickly as the time offset increases. The auto-correlation of two subcarriers is very sharp for each possible range but ambiguous as to which range to select. That is, several distinct possible delay times, or equivalently ranges ($R_1, R_2, R_3, R_4, R_5, R_6, \ldots$), are possible but each has a very low value for uncertainty. In the auto-correlation result shown, 20 possible delays (associated with an equivalent 20 range values). A particular range $R_i$ is fortunate enough to be within ±35 ns and therefore very certain, which is a great improvement over a ±4000 ns uncertainty resulting from an auto-correlation of a single subcarrier. Unfortunately, the time offset is ambiguous and additional information is needed to resolve this ambiguity.

In some embodiments, a process receives, at a first transceiver 100 (e.g. in a local unit) at a first location, a received OFDM signal from a second transceiver 200 (e.g., in a remote unit) at a second location. A subset of at least two OFDM subcarriers comprising less than a majority of the OFDM subcarriers is selected. For example, two to 10 OFDM subcarriers (such as fewer than 10% or approximately 5 OFDM subcarriers) from the 48 user data OFDM subcarriers are selected. By selecting less than a majority of the OFDM subcarriers, a majority of the OFDM subcarriers may be used to carry user data. An auto-correlating step auto-correlates the subset of at least two OFDM subcarriers of the received OFDM signal to provide an auto-correlation result having beat frequencies from subcarrier pairs within the subset of at least two OFDM subcarriers, wherein the auto-correlation result comprises a plurality of possible ranges. In some embodiments, a first transceiver 100 transmits a first transmitted OFDM signal to the second transceiver 200 and in response the second transceiver 200 transmits a second transmitted OFDM signal back to the first transceiver 100.

Figure 8:
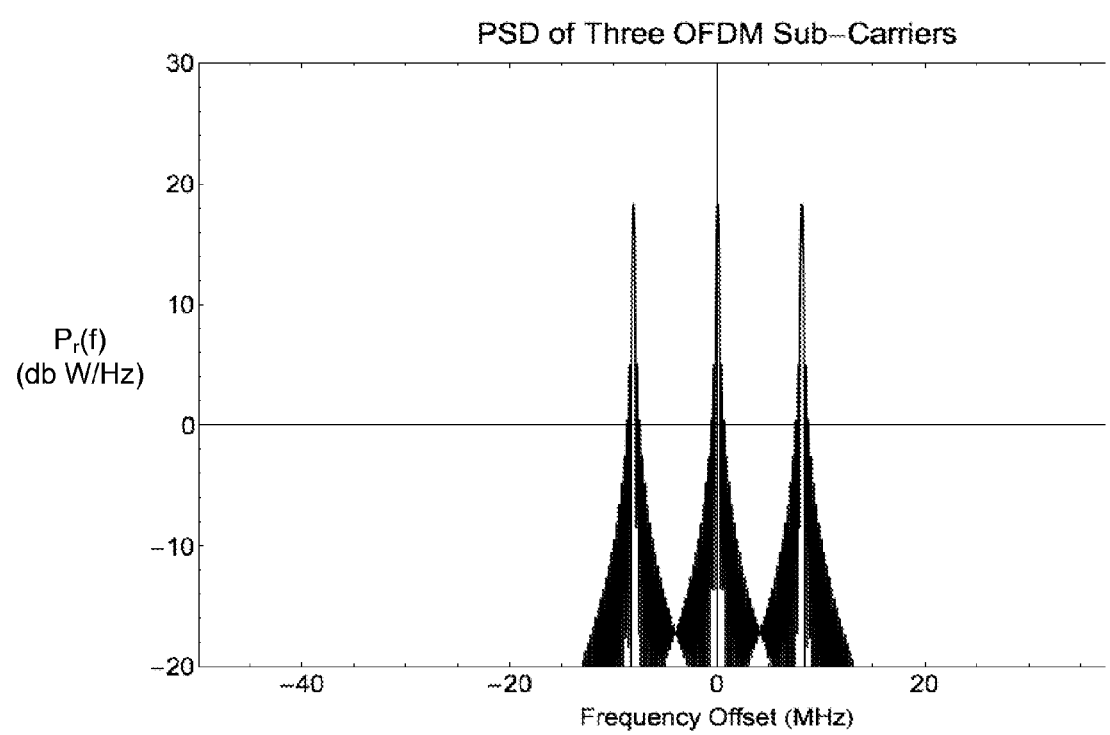
FIG. 8 shows a selection of three subcarriers from an OFDM signal, in accordance with some embodiments of the invention.
Figure 9:
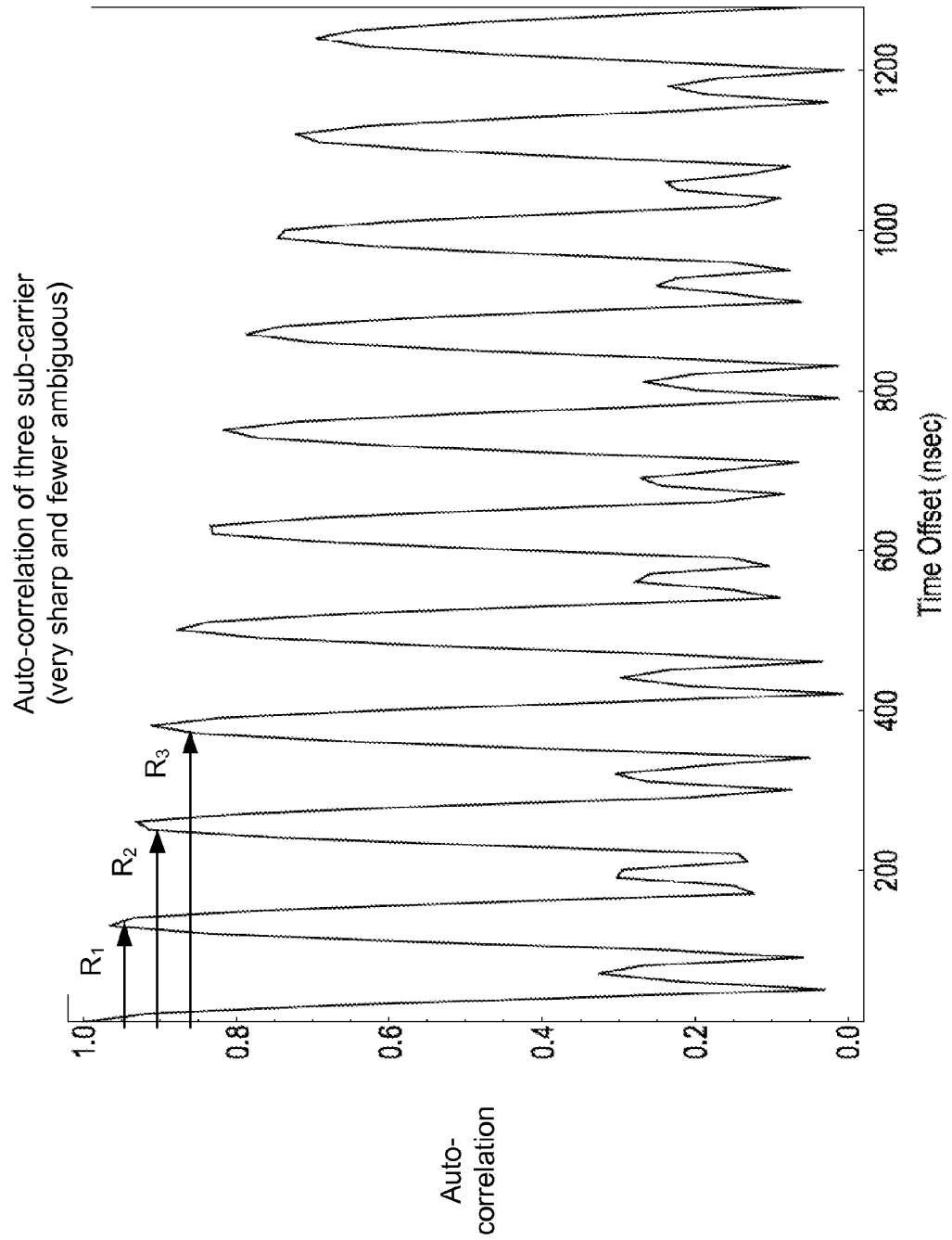
FIG. 9 shows result from an auto-correlation of three subcarriers of an OFDM signal, in accordance with some embodiments of the invention.

FIG. 8 shows a selection of three subcarriers from an OFDM signal, in accordance with some embodiments of the invention. The three subcarriers may include an upper and lower end subcarriers as describe above as well as an intermediate subcarrier. To cancel phase errors at the receiver, the upper and lower subcarriers may be selected at equal distances from the center and the middle subcarrier may be selected at the center itself. Three subcarriers offer an auto-correlation having improvement from using two subcarriers. FIG. 9 shows result from an auto-correlation of three subcarriers of an OFDM signal, in accordance with some embodiments of the invention. In the figure shown, ten possible time offsets are shown within about 1200 ns each having an uncertainty of ±35 ns. Again, each time offset represents a possible range ($R_1, R_2, R_3, \ldots$). Comparing the auto-correlation of FIG. 8 with the auto-correlation of FIG. 6 shows that an increase of one subcarrier to the auto-correlation results in half as many possible range values; thus ambiguity is reduced.

Figure 10:
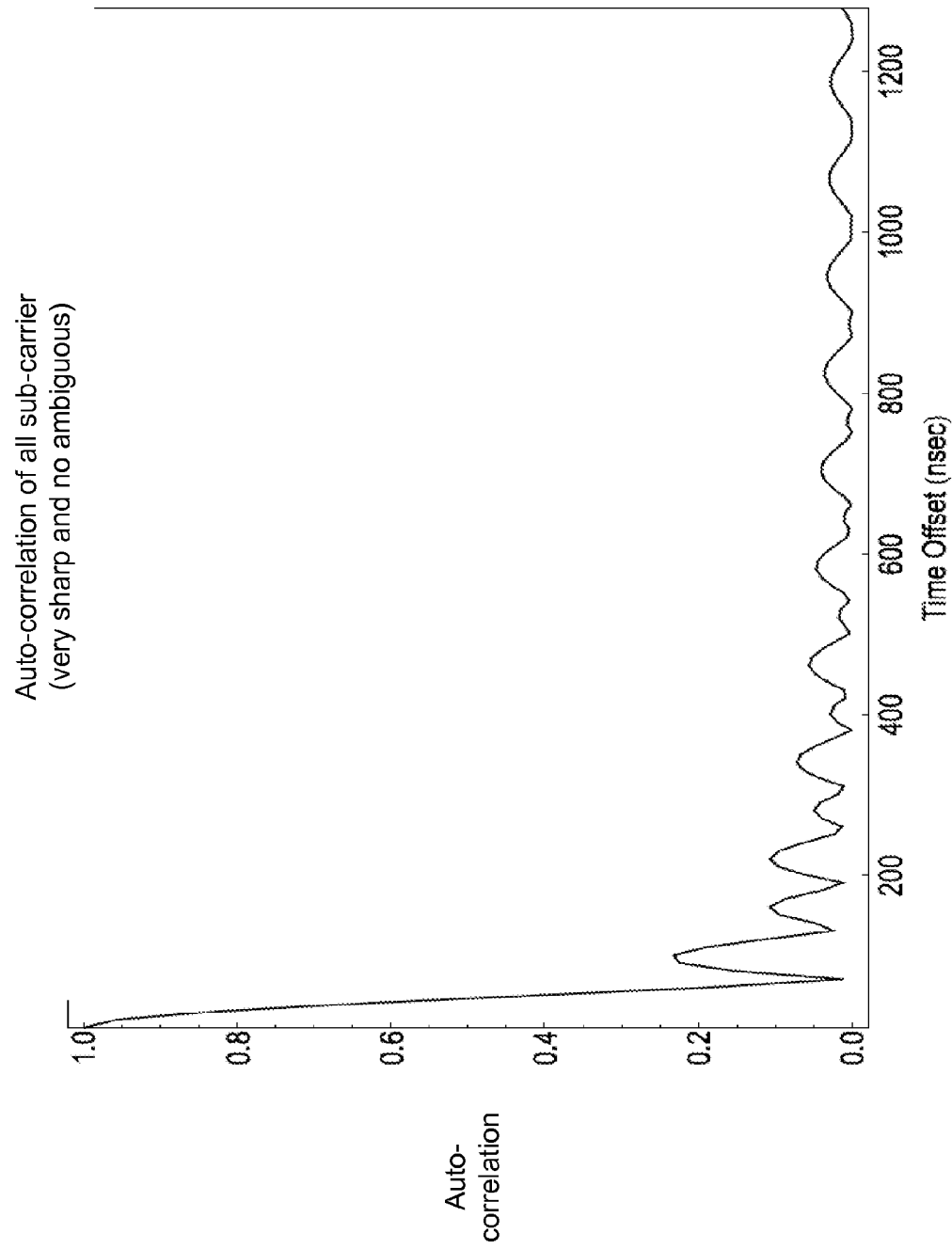
FIG. 10 shows result from an auto-correlation of all subcarriers of an OFDM signal.

FIG. 10 shows result from an auto-correlation of all subcarriers of an OFDM signal. Using all subcarriers results in an auto-correlation showing a single very sharp peak with no ambiguities. In this case, however, ranging uses all of the subcarriers in the auto-correlation leaving no free subcarriers for user data.

In summary, selecting a single subcarrier (or equivalently, a single sub-channel) results in a time offset that is very broad (i.e., a large uncertainty). Selecting two subcarriers results in ambiguous ranges (i.e., two or more possible ranges) but better defined or sharper ranges (i.e., having lower uncertainty). Selecting three subcarriers improves the ambiguousness of possible range (i.e., having even lower uncertainty). Selecting all subcarriers results in a sharp peak and removes the ambiguity but leaves no carriers for user data. In some cases, the selected sub-channels are otherwise useable for user data. In other cases, the selected sub-channels have known preambles and/or pilot sub-channels, therefore, user bandwidth is not diminished. Therefore, a balance may be used when selecting a number of subcarriers to use (e.g., pilot sub-channels, user data sub-channels and/or a time slice of a sub-channel with known or knowable data such as a preamble). Increasing the number of subcarriers reduces ambiguities but also may decrease the number of subcarriers usable for user data or require a known or knowable sub-channel to be used. Experimental results may show that selecting two, three, four, five or six subcarriers strikes a balance between an importance in obtaining a correct and accurate range and an importance of bandwidth of user data. In some embodiments, a time slice of a sub-channel is selected having a known signal, such as a preamble. In this manner, no user data sub-channel is removed from carrying user data. Instead of increasing a number of selected subcarriers to decrease ambiguities, other methods are used in the description below.

Figure 11:
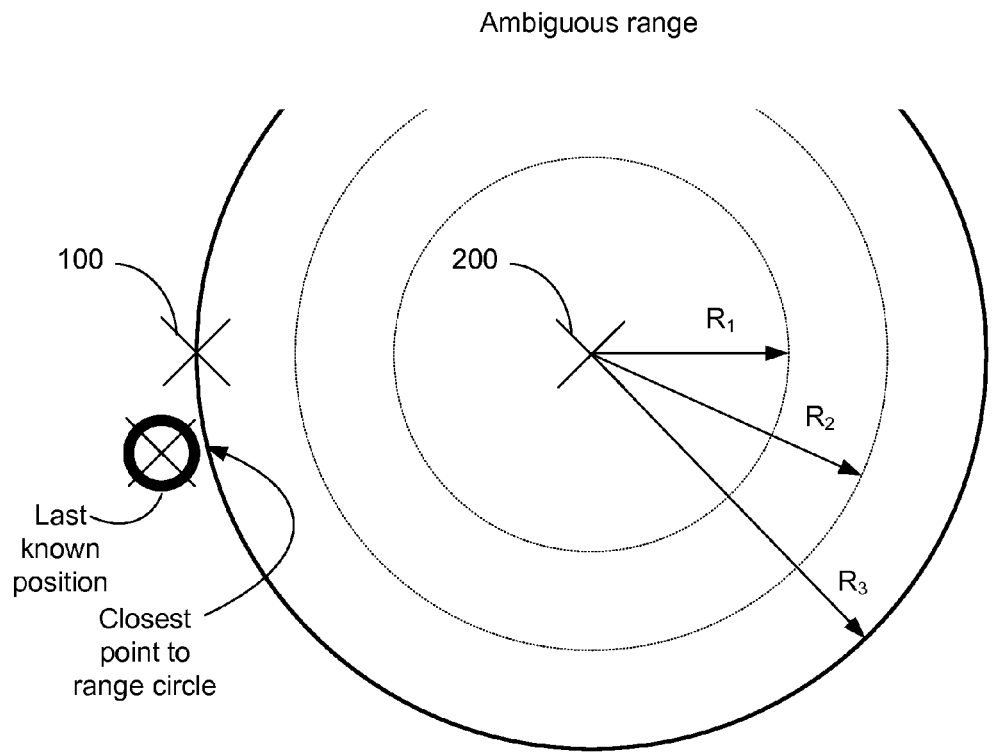
FIGS. 11 and 12 show several possible ranges between two transceivers, such as between a mobile device and an access point, using an auto-correlation of two to a few subcarriers of an OFDM signal, in accordance with some embodiments of the invention.
Figure 12:
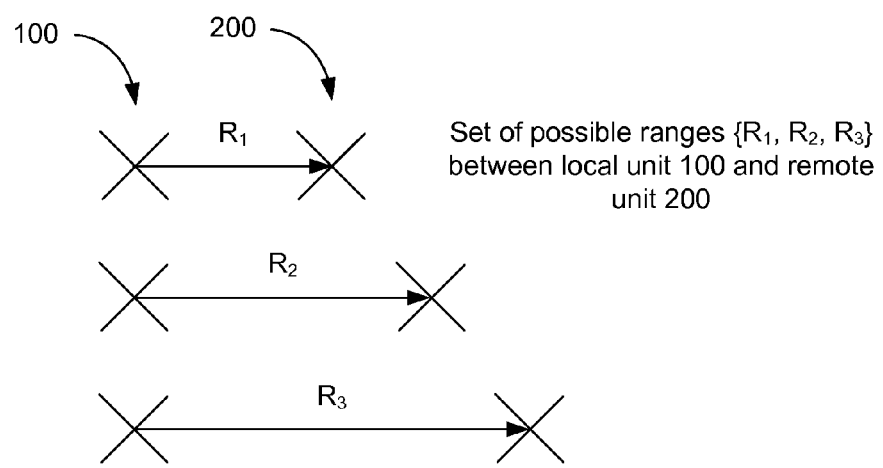

FIGS. 11 and 12 show several possible ranges between two transceivers, such as between a mobile device and an access point, using an auto-correlation of between two to a few subcarriers of an OFDM signal, in accordance with some embodiments of the invention. The first transceiver 100 (e.g. in a local unit) at a first location and the second transceiver 200 (e.g., in a remote unit) at a second location are shown each at an actual position marked by an X. A last known position (sometimes referred to as a recent position estimate) of the first transceiver 100, for example, a mobile device 300, is shown as an X with a circle within a threshold period of time.

An auto-correlation of a plurality of subcarriers results in a set of possible ranges ($R_1, R_2, R_3$, etc.) between the first transceiver 100 and the second transceiver 200. That is, the range between the first transceiver 100 and the second transceiver 200 may be $R_1$, $R_2$ or $R_3$, etc. One way of illustrating the set of possible ranges is with range circles with a radius for each determined range (e.g., $R_1$, $R_2$ or $R_3$) centered about the second transceiver 200.

To resolve this ambiguity, a first means reducing the number of possible ranges to one is by matching a last known position of the first transceiver 100 to a circle created by each range. A closest point to the range circle to the last known position may be used to select a closest range. In other words, a range between the last known position of the first transceiver 100 and the second transceiver 200 is determined. The range from the set of possible ranges is selected that is closest to the determined last known range.

Figure 13:
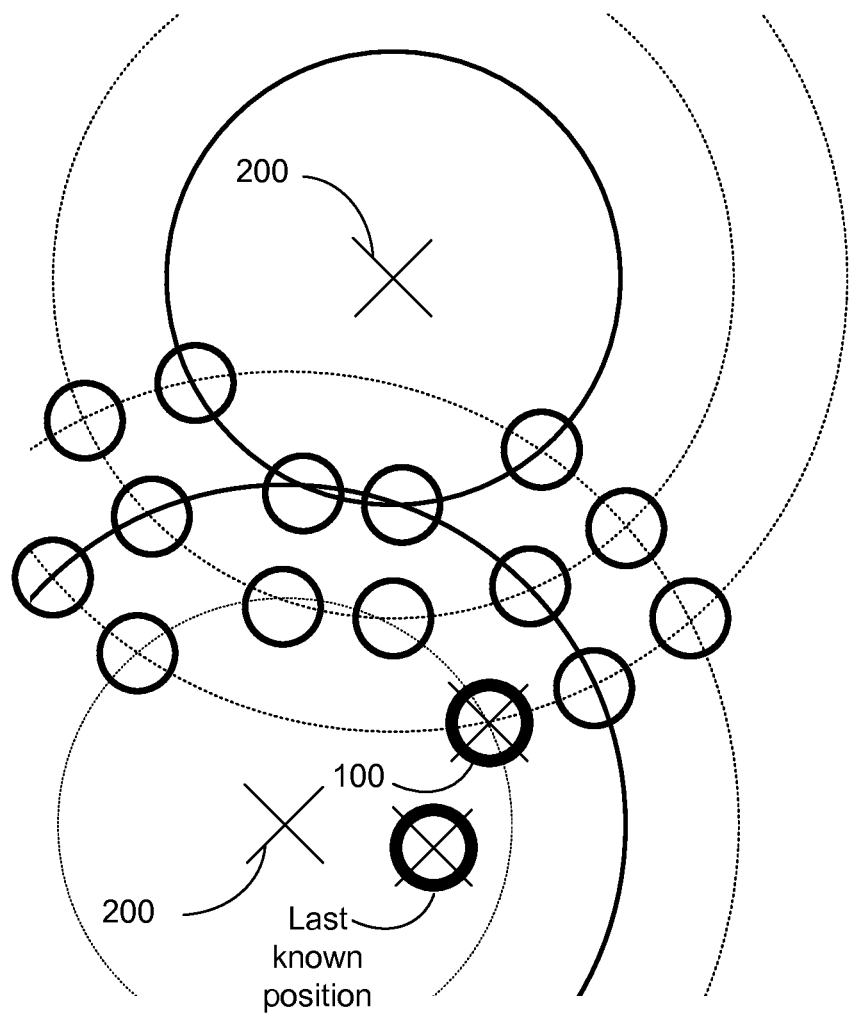
FIGS. 13 and 14 show various intersections of range circles produced from auto-correlations of OFDM subcarriers for position estimation.
Figure 14:
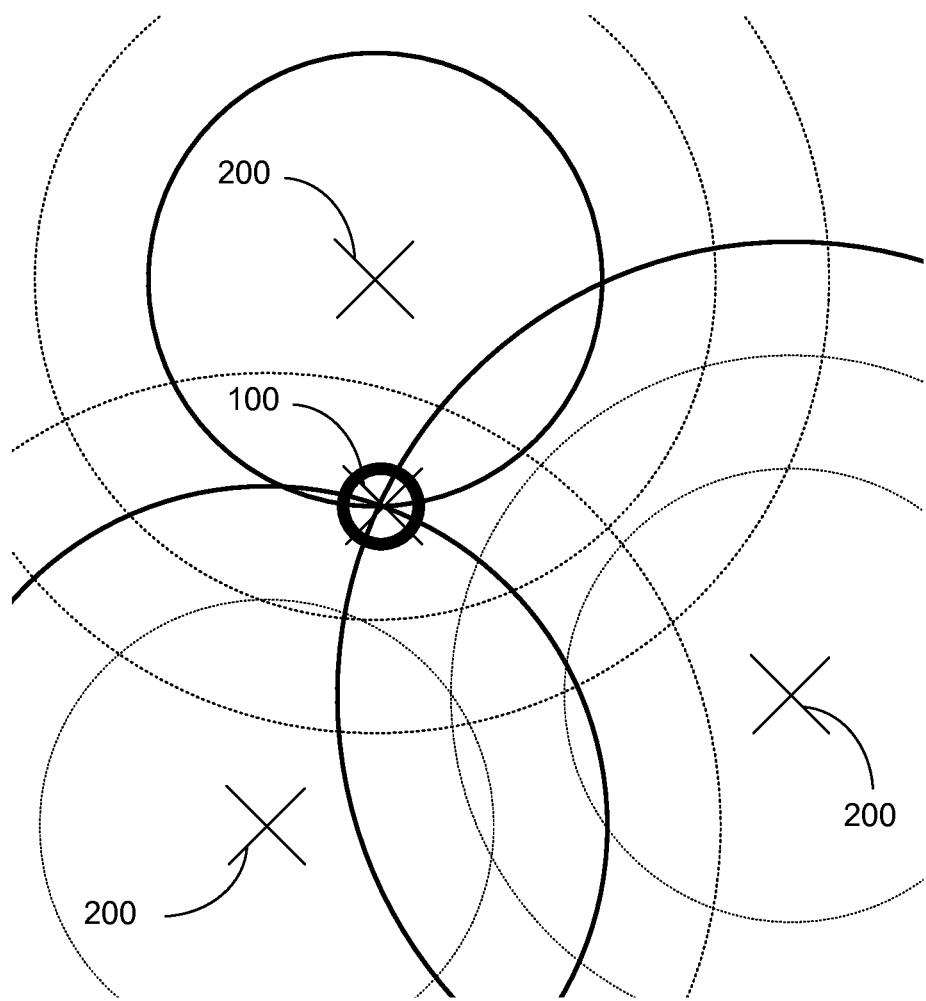

A second means to reduce the range ambiguity is by determining possible ranges to two or more remote units and finding a best intersection of range circles. FIGS. 13 and 14 show various intersections of range circles produced from auto-correlations of OFDM subcarriers for position estimation. In FIG. 13, two second transceivers 200 are shown with their determined range circles. In a system with two second transceivers 200, the ambiguity is resolved in the auto-correlation result by finding an intersection of at least two ranges. That is, resolving an ambiguity uses the auto-correlation result to determine an intersection between: (1) a range circle formed by a range of a plurality of possible ranges from each auto-correlation result; and (2) a range circle formed by a range of the second plurality of possible ranges the second auto-correlation result. A small circle is shown at each intersection of the range circles. The last known position may be compared to each intersection. The intersection closest to the last known position may be selected as the current position of the first transceiver 100. In addition, to resolve carrier phase ambiguity, a well-known least-squares ambiguity de-correlation adjustment (LAMBDA) method may be used.

In FIG. 14, three second transceivers 200 are shown with their separate set of range circles. In an embodiment with three second transceivers 200, resolving an ambiguity in the auto-correlation result comprises finding an intersection of at least three ranges. That is, resolving the ambiguity in the auto-correlation result comprises determining an intersection of: (1) a range of the plurality of possible ranges from the auto-correlation result; (2) a range of the second plurality of possible ranges the second auto-correlation result; and (3) a range of the third plurality of possible ranges the third auto-correlation result.

Three range circles may intersect at one point identifying where the first transceiver 100 is positioned. Alternatively, if more than one three-way intersection is found, the last know position of the first transceiver 100 may be used to determine which one of the three-way intersections is a correct position estimate of the first transceiver 100. One or more additional second transceivers 200 may be used to reduce intersection ambiguities as well.

Figure 15:
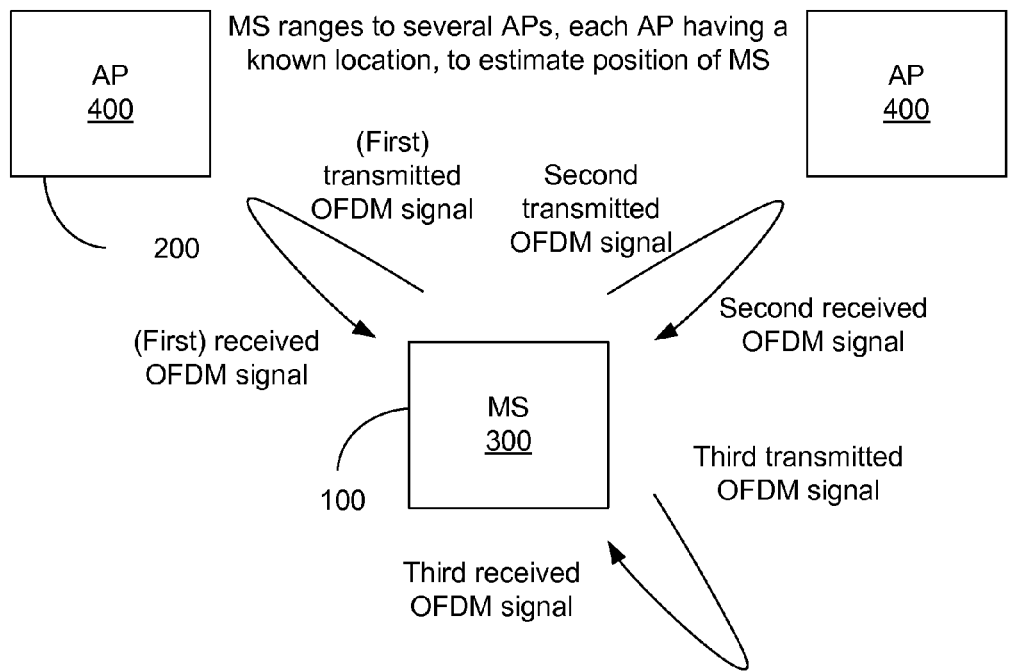
FIGS. 15, 16, 17, 18, 19 and 20 show various access point and mobile device configurations, in accordance with some embodiments of the invention.

FIGS. 15, 16, 17, 18, 19 and 20 show various access point and mobile device configurations, in accordance with some embodiments of the invention. In FIG. 15, a mobile device 300 acts as the first transceiver 100 at a first location and a plurality of access points 400 each act as the second transceiver 200 at corresponding second locations. In this example, the locations of the access points 400 are known and used to determine the location of the mobile device 300. The mobile device 300 sends a first transmitted OFDM signal to a first access point 400 and receives back a first received OFDM signal, which is used to determine a first set of possible ranges. Also, the mobile device 300 sends a second transmitted OFDM signal to a second access point 400 and receives back a second received OFDM signal, which is used to determine a second set of possible ranges. Finally, the mobile device 300 sends a third transmitted OFDM signal to a third access point 400 and receives back a third received OFDM signal, which is used to determine a third set of possible ranges.

Ranges may be represented as range circles and an intersection of three range circles may represent the current location of the mobile device 300.

Figure 16:
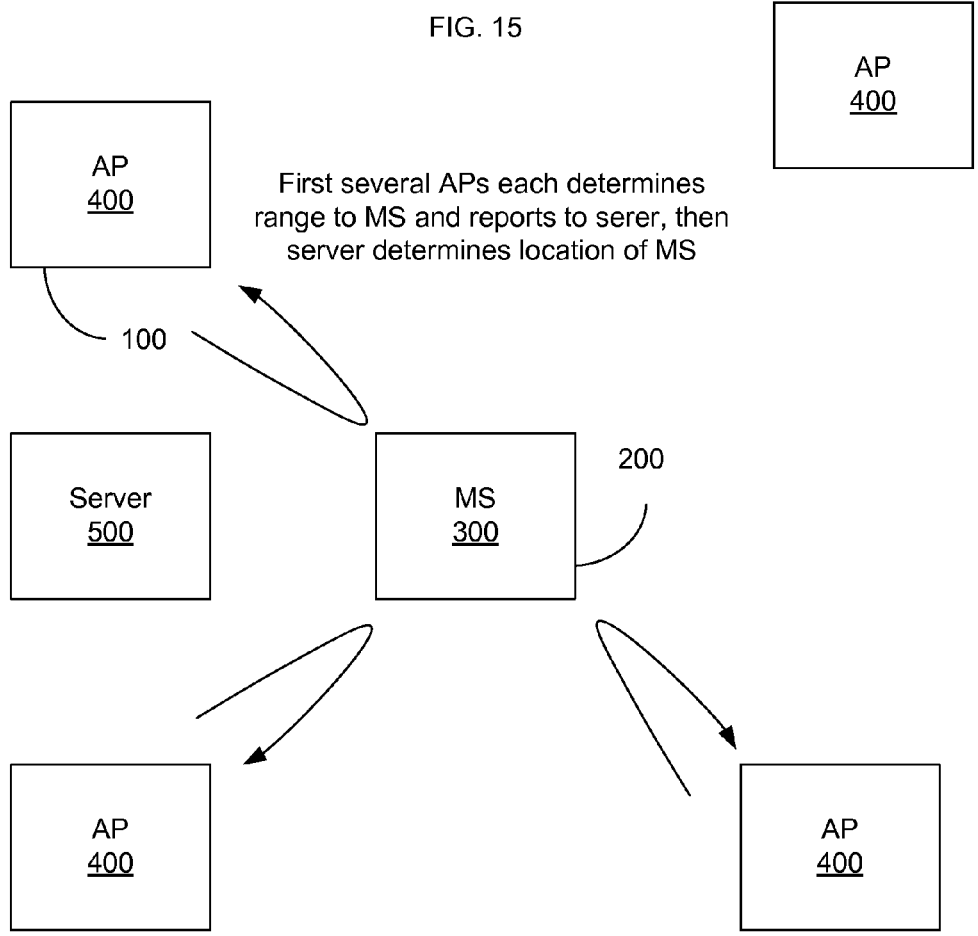

Instead of a mobile device 300 determining possible ranges to access points 400, the access points 400 may determine possible ranges to the mobile device 300. In FIG. 16, three access points 400 each and separately act as a first transceiver 100 at corresponding first location determining a set of possible ranges to the mobile device 300 acting as the second transceiver 200 at a second location. A server 500, or an access point 400 acting as a server, collects the various sets of ranges determined by each access point 400. The server 500 then determines one or more intersections between range circles produced by the set of ranges from each access point 400. If more than one intersection is determined, a best intersection is selected as the current location of the mobile device 300, for example, using the last known position.

Figure 17:
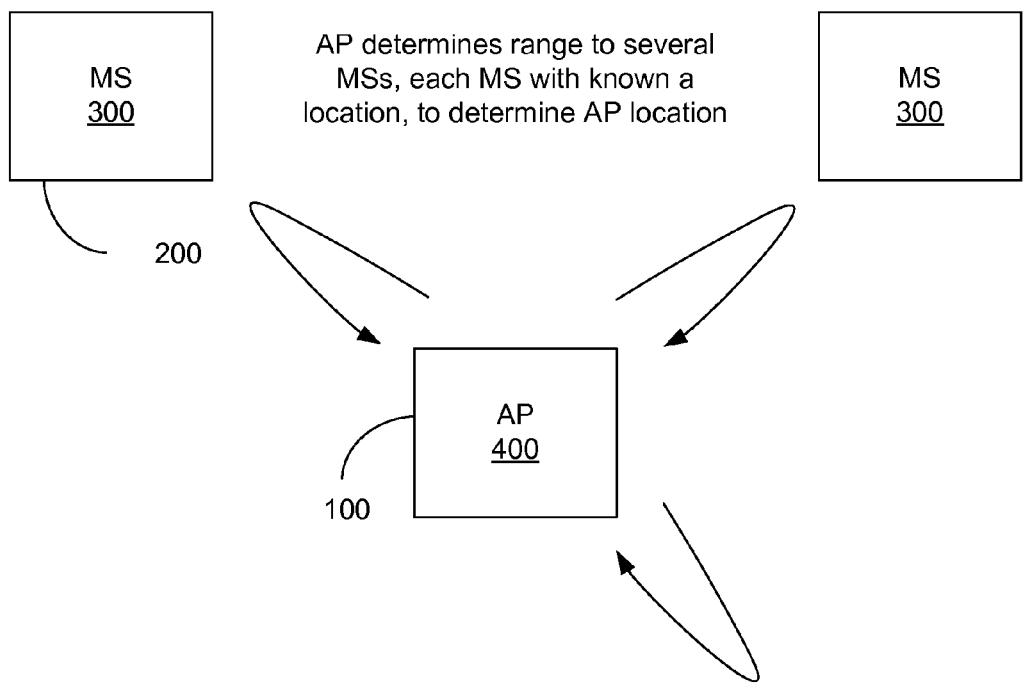

FIG. 17 is similar to FIG. 15, however, the mobile device 300 is replaced by an access point 400 and the access points 400 are replaced by mobile devices 300. The access point 400 acts as the first transceiver 100 at a first location and a plurality of mobile devices 300 each act as the second transceiver 200 at corresponding second locations. In this example, the locations of the mobile devices 300 are known and used to determine the location of the access point 400. The access point 400 sends a first transmitted OFDM signal to a first mobile device 300 and receives back a first received OFDM signal, which is used to determine a first set of possible ranges. Also, the access point 400 sends a second transmitted OFDM signal to a second mobile device 300 and receives back a second received OFDM signal, which is used to determine a second set of possible ranges. Finally, the access point 400 sends a third transmitted OFDM signal to a third mobile device 300 and receives back a third received OFDM signal, which is used to determine a third set of possible ranges. An intersection of three range circles from the sets of possible ranges may represent the current location of the access point 400.

Figure 18:
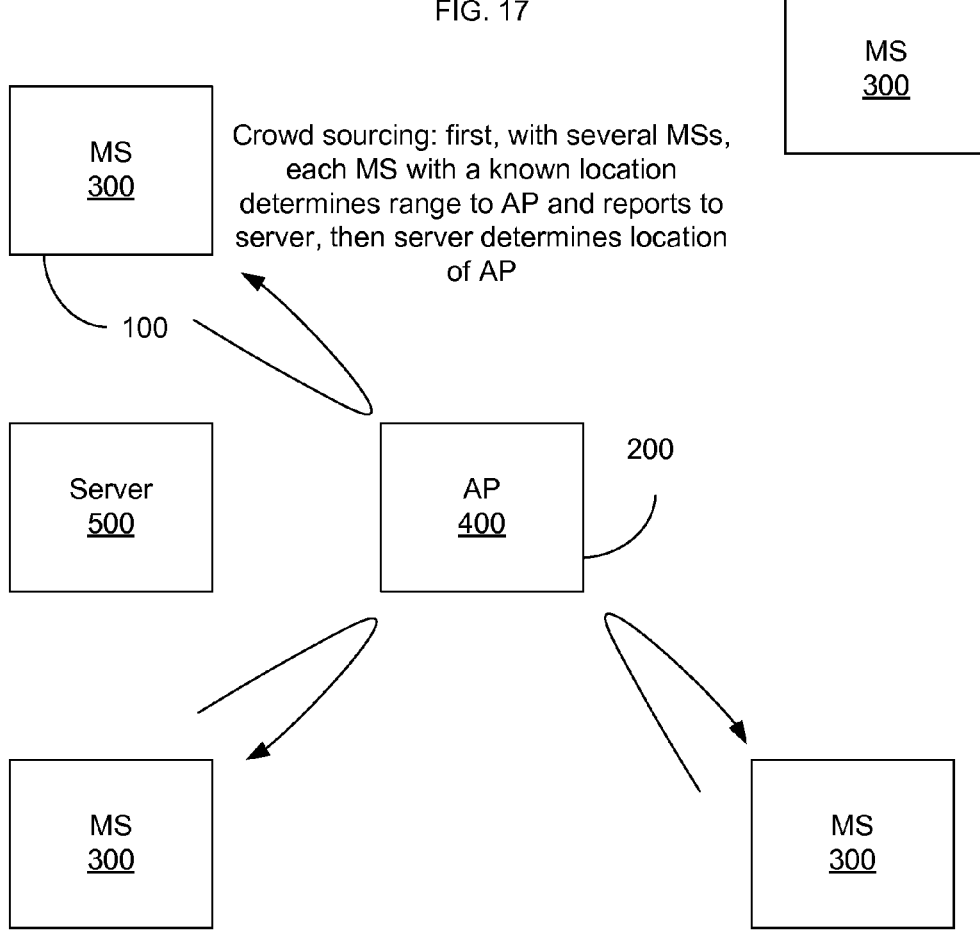

FIG. 18 is similar to FIG. 16, however, the mobile device 300 is again replaced by an access point 400 and the access points 400 are replaced by mobile devices 300. Three mobile devices 300 each and separately act as a first transceiver 100 at a corresponding first location determining a set of possible ranges to the access point 400 acting as the second transceiver 200 at a second location. A server 500 collects the various sets of ranges determined by each access mobile device 300. The server 500 then determines one or more intersections between range circles produced by the set of ranges from each mobile device 300. If more than one intersection is determine, a best intersection is selected as the location of the access point 400, for example, using RTT or RSSI methods to resolve ambiguities.

Figure 19:
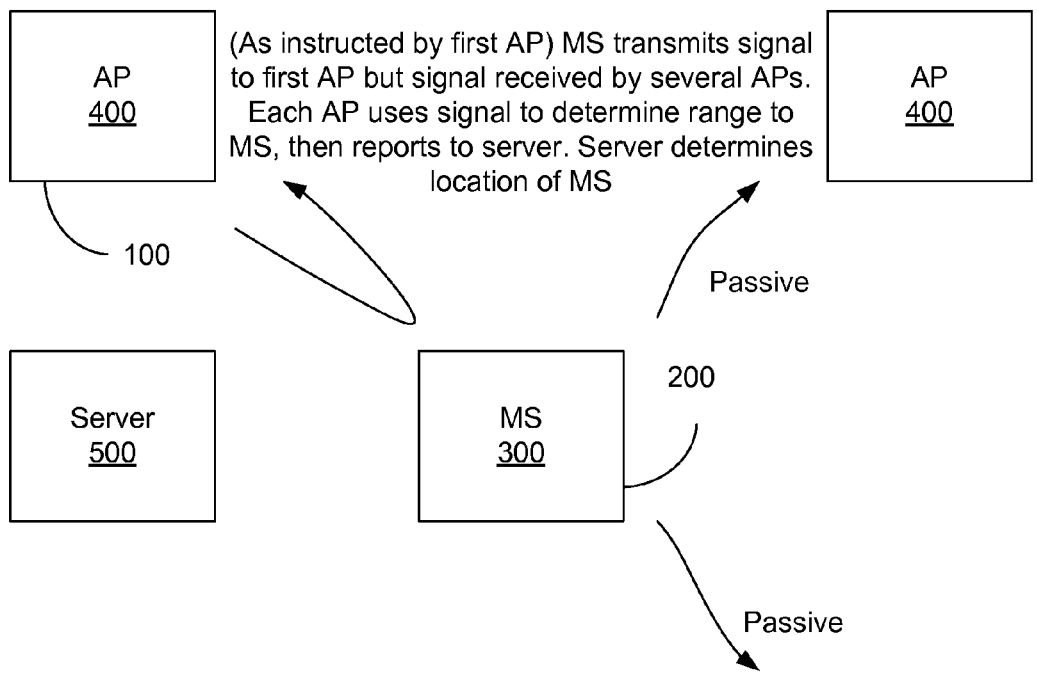

FIG. 19 is also similar to FIG. 16, however, the network is a synchronized network. That is, the mobile device 300 is synchronized to the access points 400. The access points 400 separately determine a set of ranges to the mobile device 300. A first access point 400 instructs the mobile device 300 to transmit a signal, which is received by all of the access points 400 within range. The second and third access points 400 passively listen to the signal from the mobile device 300. The access points 400 then forward the sets of possible ranges to a server 500 to determine a best intersection of range circles.

Figure 20:
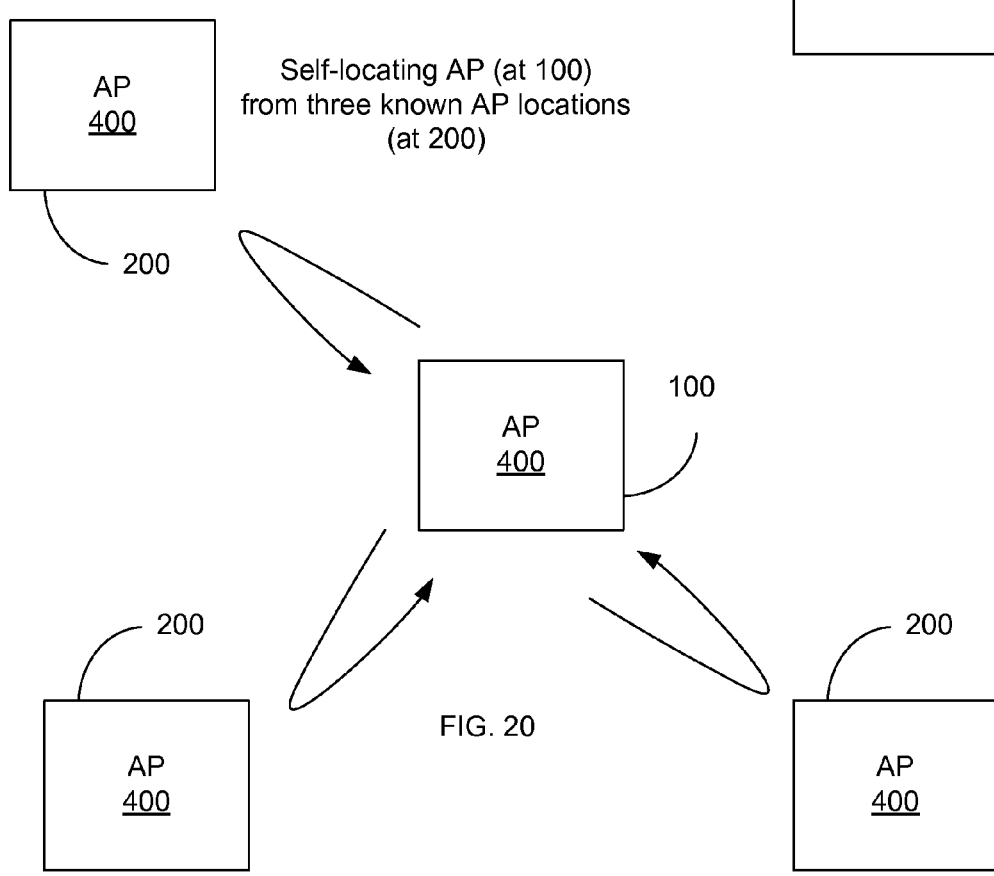

In FIG. 20, the access point 400 in the center is a self-locating access point 400 acting as a first transceiver 100 at a first location. The surrounding access points 400 act as second transceivers 200 each at a corresponding second location. The self-locating access point 400 uses auto-correlation of received signals to determine a set of possible ranges to each second transceiver 200. The access point 400 acting as the first transceiver 100 then finds a best intersection of the range circles formed by the sets of possible ranges. Similarly, a server 500 may be used to offload the first transceiver 100 from determining the best intersection of the range circles.

Figure 21:
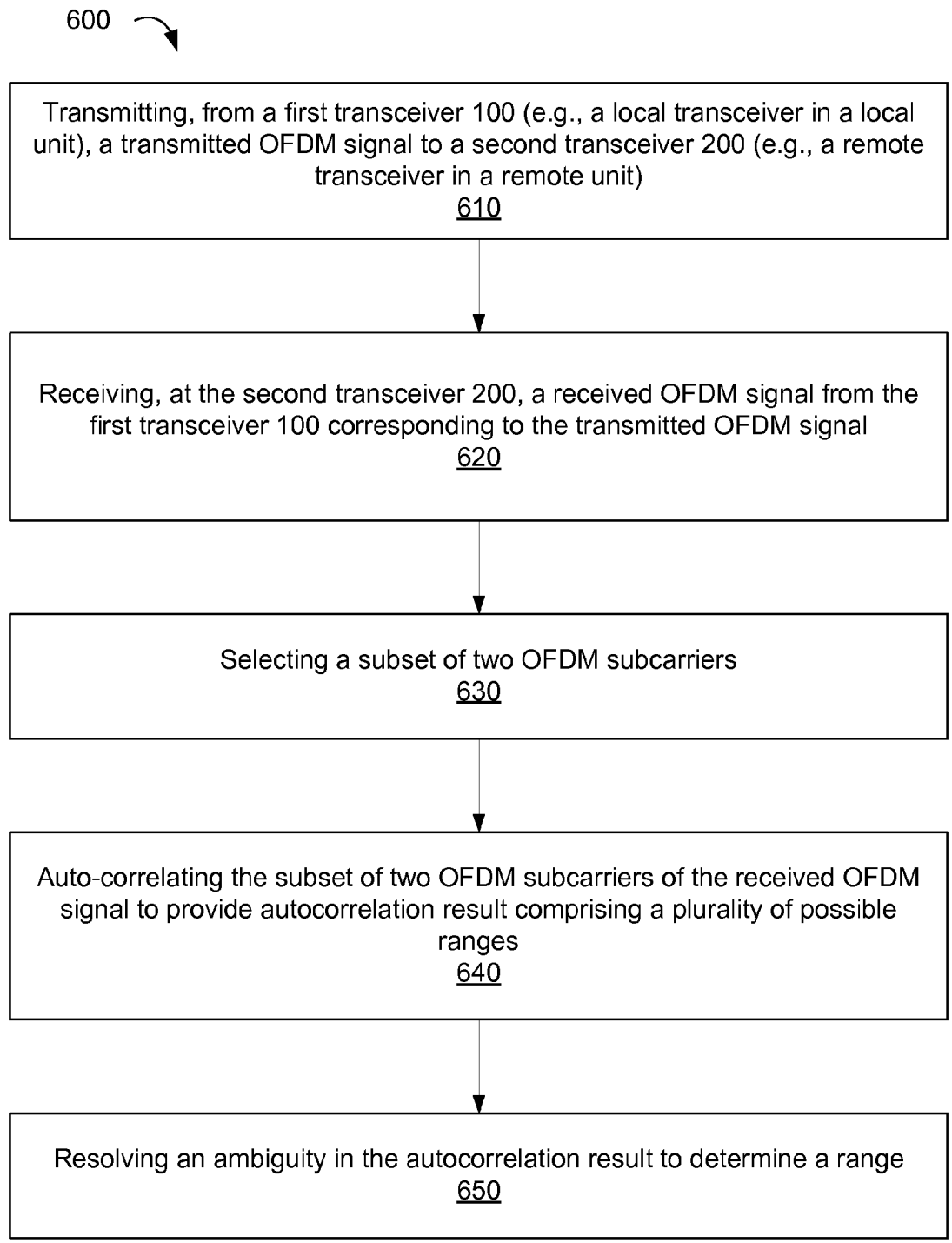
FIG. 21 illustrates a method for radio ranging based on OFDM subcarriers.

FIG. 21 illustrates a method 600 for radio ranging based on OFDM subcarriers. At 610, a processor transmits, from a first transceiver 100 (e.g., a local transceiver in a local unit at a first location), a transmitted OFDM signal to a second transceiver 200 (e.g., a remote transceiver in a remote unit at a second location). At 620, the second transceiver 200 receives a received OFDM signal from the first transceiver 100 corresponding to the transmitted OFDM signal. At 630, the processor selects a subset of two OFDM subcarriers. At 640, the processor auto-correlates the subset of two OFDM subcarriers of the received OFDM signal to provide auto-correlation result comprising a plurality of possible ranges. At 650, the processor resolves an ambiguity in the auto-correlation result to determine a range.

Figure 22:
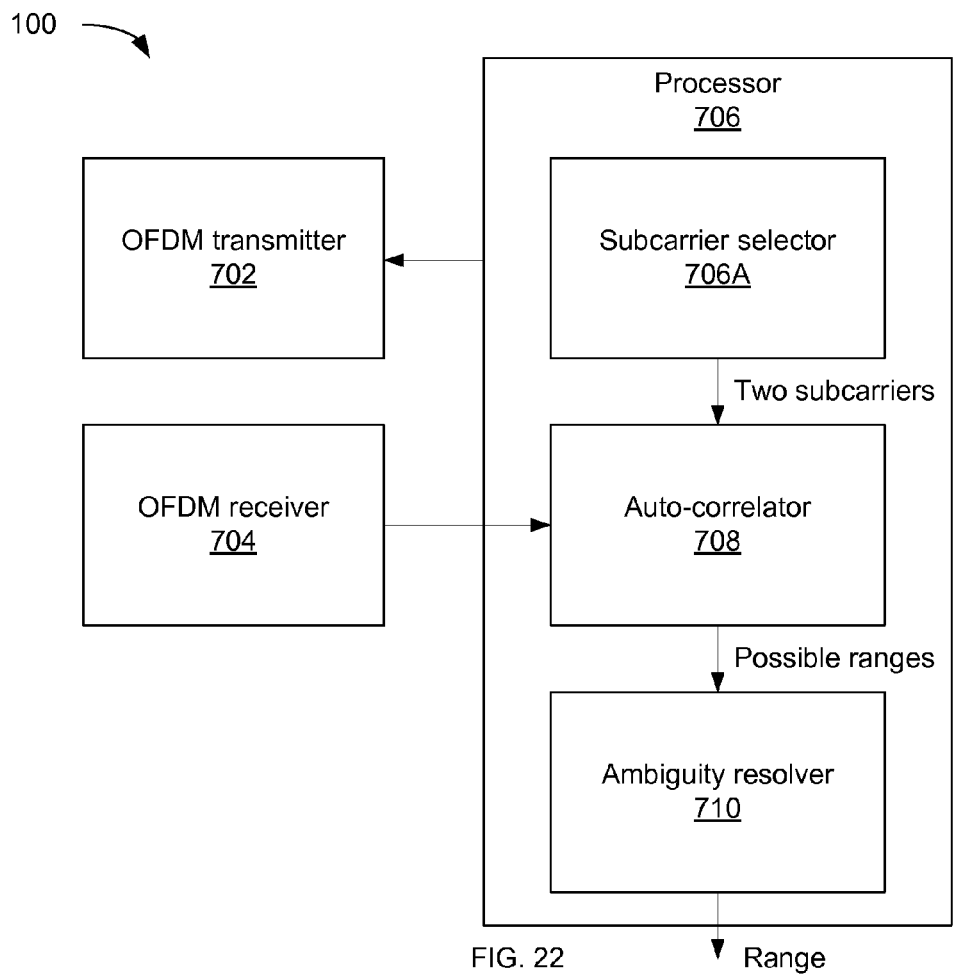
FIGS. 22 and 23 show possible configurations of a transceiver, in accordance with some embodiments of the invention.
Figure 23:
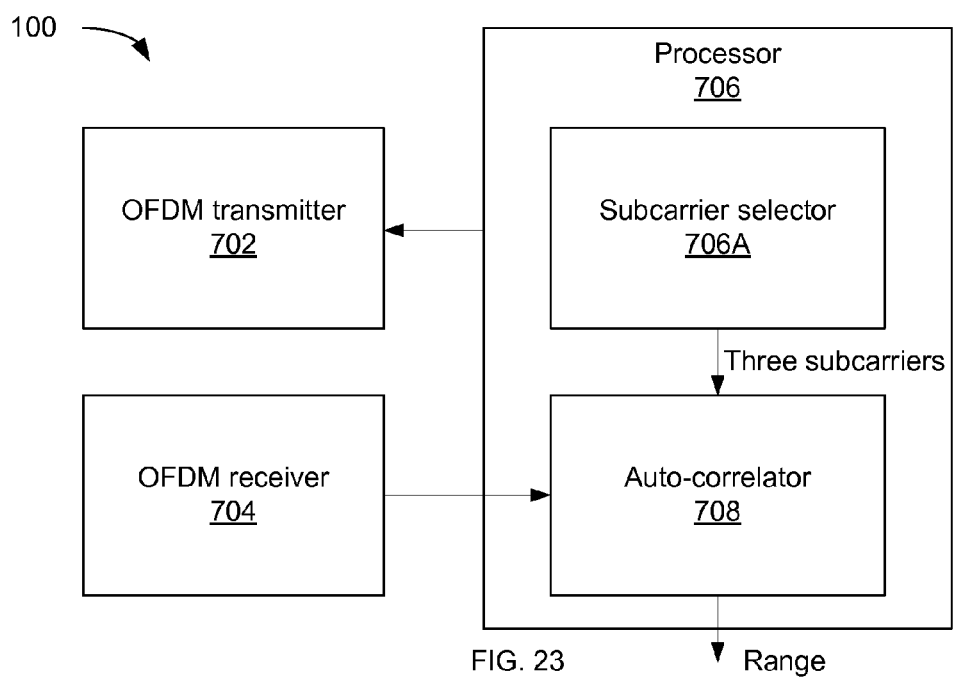

FIGS. 22 and 23 show possible configurations of a transceiver, in accordance with some embodiments of the invention. In FIG. 22, a first transceiver 100 includes an optional OFDM transmitter 702, an OFDM receiver 704 and a processor 706. The optional OFDM transmitter 702 may instruct one or more second transceivers 200 to transmit an OFDM signal. The processor 706 includes modules, which may be implemented in software and/or in hardware. The modules include a subcarrier selector 706A, an auto-correlator 708, and an ambiguity resolver 710.

The subcarrier selector 706A selects two subcarriers. For example, the subcarrier selector 706A may have a hard coded selection of the first and last pilot signals. The auto-correlator 708 is coupled to receive an OFDM signal from the receiver. The auto-correlator 708 performs auto-correlation on the received OFDM signal for the subcarriers identified by the subcarrier selector 706A. The auto-correlator 708 results in an auto-correlation that defines a set of possible ranges. The ambiguity resolver 710 reduces the set of ranges to a single range by using one of the methods described above. In FIG. 23, a first transceiver 100 includes an optional OFDM transmitter 702, an OFDM receiver 704 and a processor 706 as described above, however, the processor 706 does not include an ambiguity resolver 710. Ambiguities are resolved by selecting three or more subcarriers thereby finding a best intersection as described above. The range provided by the first transceiver 100 illustrated in FIGS. 22 and 23 may use trilateration to determine a position estimate of the first transceiver 100.

Figure 24:
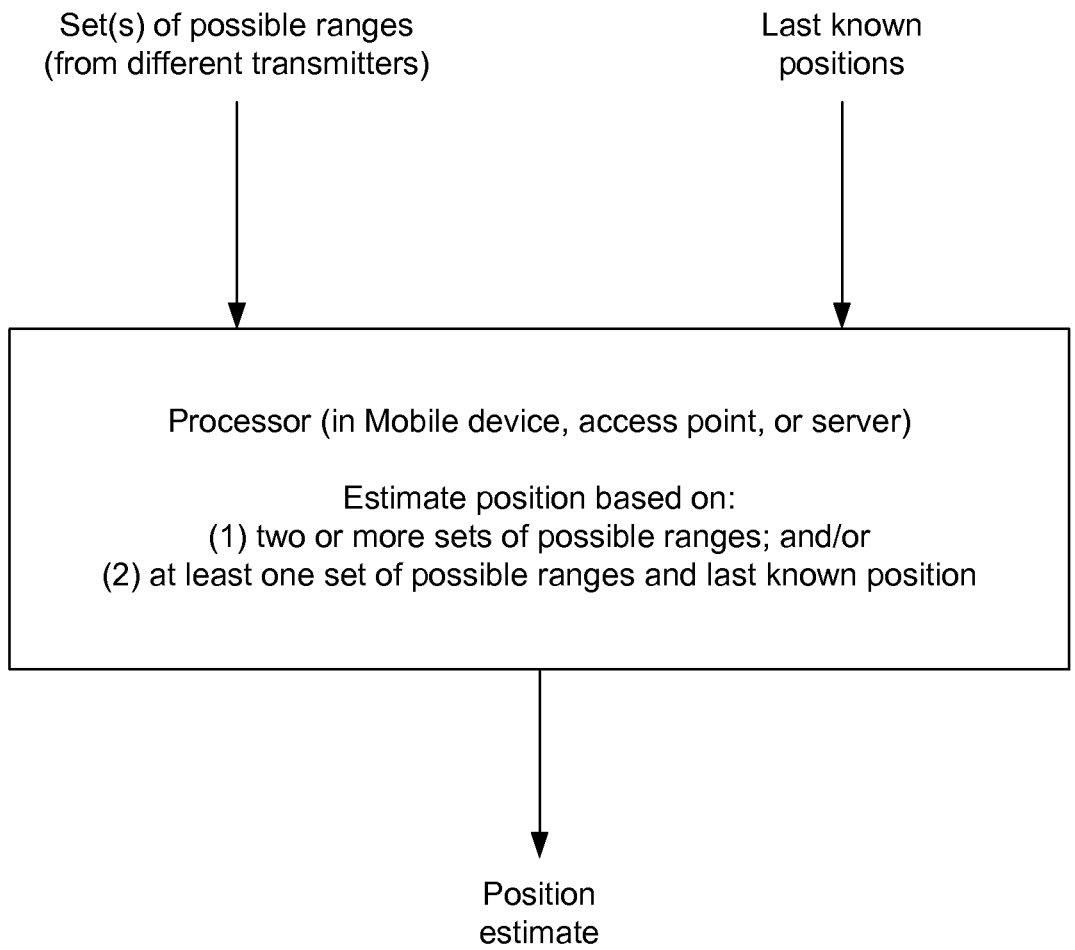
FIG. 24 shows a method to determine a position estimate of a mobile device.

FIG. 24 shows a method to determine a position estimate of a mobile device. The process receives one or more sets of possible ranges from a first transceiver 100 to a corresponding one or more second transceivers 200. Each second transceiver 200 provides a different set of possible ranges between that second transceiver 200 and the first transceiver 100. The process also receives the last known position or positions of the first transceiver 100. A processor (e.g., a processor in a local device 100, remote device 200, mobile device 300, access point 400 or server 500) estimates position based on: (1) two or more sets of possible ranges; and/or (2) at least one set of possible ranges and last known position estimate of the local device 100. The processor then provides the position estimate of the first transceiver 100 to a follow-on application, for example, the display or record the position of the first transceiver 100.

The methodologies described herein may be implemented by various means depending upon the application. For example, these methodologies may be implemented in hardware, firmware, software, or any combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory and executed by a processor unit. Memory may be implemented within the processor unit or external to the processor unit. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims. That is, the communication apparatus includes transmission media with signals indicative of information to perform disclosed functions. At a first time, the transmission media included in the communication apparatus may include a first portion of the information to perform the disclosed functions, while at a second time the transmission media included in the communication apparatus may include a second portion of the information to perform the disclosed functions.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

What is claimed is:

1. A method for radio ranging based on orthogonal frequency division multiplexing (OFDM) subcarriers, the method comprising:
receiving, at a first transceiver, a first OFDM signal from a second transceiver;
selecting a subset of at least two OFDM subcarriers comprising less than a majority of the OFDM subcarriers;
auto-correlating the subset of at least two OFDM subcarriers with the first OFDM signal to provide an auto-correlation result having a beat frequency from the subset of at least two OFDM subcarriers, wherein the auto-correlation result comprises a plurality of possible ranges; and
resolving an ambiguity in the auto-correlation result to determine a single range, wherein resolving the ambiguity comprises:
receiving, at the first transceiver, a second OFDM signal from a third transceiver;
auto-correlating the subset of at least two OFDM subcarriers with the second OFDM signal to provide a second auto-correlation result comprising a second plurality of possible ranges; and
determining an intersection of a range of the plurality of possible ranges from the auto-correlation result and a range of the second plurality of possible ranges from the second auto-correlation result.

2. The method of claim 1, further comprising:
transmitting, from the first transceiver, a transmitted OFDM signal to the second transceiver;
wherein the first OFDM signal, received from the second transceiver, is sent by the second transceiver in response to receiving the transmitted OFDM signal at the second transceiver.

3. The method of claim 1, wherein selecting the subset of at least two OFDM subcarriers comprises:
selecting a first subcarrier having a lowest useable frequency; and
selecting a second subcarrier having a highest usable frequency.

4. The method of claim 1, wherein the subset of at least two OFDM subcarriers comprises pilot signals.

5. The method of claim 1, wherein the subset of at least two OFDM subcarriers comprises known signals.

6. The method of claim 1, wherein the subset of at least two OFDM subcarriers comprises unknown but determinable signals.

7. The method of claim 1, further comprising:
receiving, at the first transceiver, a third OFDM signal from a fourth transceiver; and
auto-correlating the subset of at least two OFDM subcarriers with the third OFDM signal to provide a third auto-correlation result comprising a second plurality of possible ranges;
wherein resolving the ambiguity in the auto-correlation result comprises determining an intersection of:
the range of the plurality of possible ranges from the auto-correlation result;
the range of the second plurality of possible ranges from the second auto-correlation result; and
a range of a third plurality of possible ranges from the third auto-correlation result.

8. The method of claim 1, wherein resolving the ambiguity in the auto-correlation result comprises finding an intersection of at least two ranges.

9. The method of claim 1, wherein resolving the ambiguity in the auto-correlation result further comprises using a recent position estimate.

10. The method of claim 1, wherein resolving the ambiguity in the auto-correlation result comprises finding an intersection of at least three ranges.

11. The method of claim 1, wherein resolving the ambiguity in the auto-correlation result comprises selecting a range based on a recent position estimate.

12. The method of claim 1, wherein the first transceiver and the second transceiver have synchronized clocks.

13. The method of claim 1, wherein the first transceiver and the second transceiver have asynchronous clocks.

14. The method of claim 1, wherein the first transceiver comprises a first access point and the second transceiver comprises a second access point.

15. The method of claim 1, wherein the first transceiver comprises an access point and the second transceiver comprises a mobile device.

16. The method of claim 1, wherein the first transceiver comprises a mobile device and the second transceiver comprises an access point.

17. The method of claim 1, wherein the first transceiver comprises a first mobile device and the second transceiver comprises a second mobile device.

18. The method of claim 1, further comprising reporting the plurality of possible ranges to a server.

19. The method of claim 1, wherein the subset of at least two OFDM subcarriers comprises only two OFDM subcarriers.

20. A mobile device for radio ranging based on orthogonal frequency division multiplexing (OFDM) subcarriers, the mobile device comprising:
a first transceiver configured to receive a first OFDM signal from a second transceiver and a second OFDM signal from a third transceiver; and
a processor coupled to the first transceiver, the processor configured to:
select a subset of at least two OFDM subcarriers comprising less than a majority of the OFDM subcarriers;
auto-correlate the subset of at least two OFDM subcarriers with the first OFDM signal to provide an auto-correlation result having a beat frequency from the subset of at least two OFDM subcarriers, wherein the auto-correlation result comprises a plurality of possible ranges: and
resolve an ambiguity in the auto-correlation result to determine a single range, wherein the processor is configured to resolve the ambiguity by being configured to:
auto-correlate the subset of at least two OFDM subcarriers with the second OFDM signal to provide a second auto-correlation result comprising a second plurality of possible ranges; and
determine an intersection of a range of the plurality of possible ranges from the auto-correlation result and a range of the second plurality of possible ranges from the second auto-correlation result.

21. The mobile device of claim 20, wherein the processor is further configured to:
transmit, from the first transceiver, a transmitted OFDM signal to the second transceiver;

wherein the first OFDM signal, received from the second transceiver, is sent by the second transceiver in response to receiving the transmitted OFDM signal at the second transceiver.

22. The mobile device of claim 20, wherein the processor is further configured to select the subset of at least two OFDM subcarriers is configured to:
   select a first subcarrier having a lowest useable frequency; and
   select a second subcarrier having a highest usable frequency.

23. The mobile device of claim 20, wherein the processor configured to resolve the ambiguity in the auto-correlation result is configured to select a range based on a recent position estimate.

24. A mobile device for radio ranging based on orthogonal frequency division multiplexing (OFDM) subcarriers, the mobile device comprising:
   means for receiving, at a first transceiver, a first OFDM signal from a second transceiver;
   means for selecting a subset of at least two OFDM subcarriers comprising less than a majority of the OFDM subcarriers; and
   means for auto-correlating the subset of at least two OFDM subcarriers with the first OFDM signal to provide an auto-correlation result having a beat frequency from the subset of at least two OFDM subcarriers, wherein the auto-correlation result comprises a plurality of possible ranges; and
   means for resolving an ambiguity in the auto-correlation result to determine a single range, wherein the means for resolving the ambiguity comprises;
      means for receiving, at the first transceiver, a second OFDM signal from a third transceiver; and
      means for auto-correlating the subset of at least two OFDM subcarriers with the second OFDM signal to provide a second auto-correlation result comprising a second plurality of possible ranges;
      means for determining an intersection of a range of the plurality of possible ranges from the auto-correlation result and a range of the second plurality of possible ranges from the second auto-correlation result.

25. The mobile device of claim 24, further comprising:
   means for transmitting, from the first transceiver, a transmitted OFDM signal to the second transceiver;
   wherein the first OFDM signal, received from the second transceiver, is sent by the second transceiver in response to receiving the transmitted OFDM signal at the second transceiver.

26. The mobile device of claim 24, wherein the means for selecting the subset of at least two OFDM subcarriers comprises:
   means for selecting a first subcarrier having a lowest useable frequency; and
   means for selecting a second subcarrier having a highest usable frequency.

27. The mobile device of claim 24, wherein the means for resolving the ambiguity in the auto-correlation result comprises means for selecting a range based on a recent position estimate.

28. A non volatile non-transitory computer-readable storage medium including program code stored thereon for radio ranging based on orthogonal frequency division multiplexing (OFDM) subcarriers, the program code comprising code for:
   receiving, at a first transceiver, a first OFDM signal from a second transceiver;
   selecting a subset of at least two OFDM subcarriers comprising less than a majority of the OFDM subcarriers;
   auto-correlating the subset of at least two OFDM subcarriers with the first OFDM signal to provide an auto-correlation result having a beat frequency from the subset of at least two OFDM subcarriers, wherein the auto-correlation result comprises a plurality of possible ranges: and
   resolving an ambiguity in the auto-correlation result to determine a single range, wherein code for resolving the ambiguity comprises code for:
      receiving, at the first transceiver, a second OFDM signal from a third transceiver; and
      auto-correlating the subset of at least two OFDM subcarriers with the second OFDM signal to provide a second auto-correlation result comprising a second plurality of possible ranges;
      determining an intersection of a range of the plurality of possible ranges from the auto-correlation result and a range of the second plurality of possible ranges from the second auto-correlation result.

29. The non-transitory computer-readable storage medium of claim 28, further comprising code for:
   transmitting, from the first transceiver, a transmitted OFDM signal to the second transceiver;
   wherein the first OFDM signal, received from the second transceiver, is sent by the second transceiver in response to receiving the transmitted OFDM signal at the second transceiver.

30. The non-transitory computer-readable storage medium of claim 28, wherein code for selecting the subset of at least two OFDM subcarriers comprises code for:
   selecting a first subcarrier having a lowest useable frequency; and
   selecting a second subcarrier having a highest usable frequency.

31. The non-transitory computer-readable storage medium of claim 28, wherein code for resolving the ambiguity in the auto-correlation result comprises code for selecting a range based on a recent position estimate.

32. A method for radio ranging based on orthogonal frequency division multiplexing (OFDM) subcarriers, the method comprising:
   receiving, at a first transceiver, a first OFDM signal from a second transceiver;
   selecting a subset of at least two OFDM subcarriers;
   auto-correlating the subset of at least two OFDM subcarriers with the first OFDM signal to provide an auto-correlation result comprising a plurality of possible ranges; and
   resolving an ambiguity in the auto-correlation result to determine a single range using a recent position estimate.

33. The method of claim 32, wherein the subset of at least two OFDM subcarriers comprises a number less than 10% of a total number of OFDM subcarriers.

34. The method of claim 32, further comprising:
   transmitting, from the first transceiver, a transmitted OFDM signal to the second transceiver;
   wherein the first OFDM signal, received from the second transceiver, is sent by the second transceiver in response to receiving the transmitted OFDM signal at the second transceiver.

35. The method of claim 32, wherein selecting the subset of at least two OFDM subcarriers comprises:
   selecting a first subcarrier having a lowest useable frequency;

selecting a second subcarrier having a highest usable frequency; and select a third subcarrier having a middle usable frequency.

36. A mobile device for radio ranging based on orthogonal frequency division multiplexing (OFDM) subcarriers, the mobile device comprising:
a first transceiver configured to receive a first OFDM signal from a second transceiver; and
a processor coupled to the first transceiver, the processor configured to:
select a subset of at least two OFDM subcarriers;
auto-correlate the subset of at least two OFDM subcarriers with the first OFDM signal to provide an auto-correlation result comprising a plurality of possible ranges; and
resolve an ambiguity in the auto-correlation result to determine a single range using a recent position estimate.

37. The mobile device of claim 36, wherein the subset of at least two OFDM subcarriers comprises a number less than 10% of a total number of OFDM subcarriers.

38. The mobile device of claim 36, wherein the processor is further configured to:
transmit, from the first transceiver, a transmitted OFDM signal to the second transceiver;
wherein the first OFDM signal, received from the second transceiver, is sent by the second transceiver in response to receiving the transmitted OFDM signal at the second transceiver.

39. The mobile device of claim 36, wherein the processor configured to select the subset of at least two OFDM subcarriers is configured to:
select a first subcarrier having a lowest useable frequency;
select a second subcarrier having a highest usable frequency; and
select a third subcarrier having a middle usable frequency.

40. A mobile device for radio ranging based on orthogonal frequency division multiplexing (OFDM) subcarriers, the mobile device comprising:
means for receiving, at a first transceiver, a first OFDM signal from a second transceiver;
means for selecting a subset of at least two OFDM subcarriers;
means for auto-correlating the subset of at least two OFDM subcarriers with the first OFDM signal to provide an auto-correlation result comprising a plurality of possible ranges; and
means for resolving an ambiguity in the auto-correlation result to determine a single range using a recent position estimate.

41. The mobile device of claim 40, wherein the subset of at least two OFDM subcarriers comprises a number less than 10% of a total number of OFDM subcarriers.

42. The mobile device of claim 40, further comprising:
means for transmitting, from the first transceiver, a transmitted OFDM signal to the second transceiver;
wherein the means for receiving the first OFDM signal, received from the second transceiver, is sent by the second transceiver in response to receiving the transmitted OFDM signal at the second transceiver.

43. The mobile device of claim 40, wherein the means for selecting the subset of at least two OFDM subcarriers comprises:
means for selecting a first subcarrier having a lowest useable frequency;
means for selecting a second subcarrier having a highest usable frequency; and
means for selecting a third subcarrier having a middle usable frequency.

44. A non-transitory computer-readable storage medium including program code stored thereon for radio ranging based on orthogonal frequency division multiplexing (OFDM) subcarriers, the program code comprising code for:
receiving, at a first transceiver, a first OFDM signal from a second transceiver;
selecting a subset of at least two OFDM subcarriers;
auto-correlating the subset of at least two OFDM subcarriers with the first OFDM signal to provide an auto-correlation result comprising a plurality of possible ranges; and
resolving an ambiguity in the auto-correlation result to determine a single range using a recent position estimate.

45. The non-transitory computer-readable storage medium of claim 44, further comprising code for:
transmitting, from the first transceiver, a transmitted OFDM signal to the second transceiver;
wherein the code for receiving the first OFDM signal, received from the second transceiver, is sent by the second transceiver in response to receiving the transmitted OFDM signal at the second transceiver.

46. The non-transitory computer-readable storage medium of claim 44, wherein code for selecting the subset of at least two OFDM subcarriers comprises code for:
selecting a first subcarrier having a lowest useable frequency;
selecting a second subcarrier having a highest usable frequency; and
selecting a third subcarrier having a middle usable frequency.

* * * * *

UNITED STATES PATENT AND TRADEMARK OFFICE
CERTIFICATE OF CORRECTION

PATENT NO. : 9,274,210 B2  
APPLICATION NO. : 13/656398  
DATED : March 1, 2016  
INVENTOR(S) : Per Enge et al.

It is certified that error appears in the above-identified patent and that said Letters Patent is hereby corrected as shown below:

In the claims,

In column 15, line 62, in claim 28, delete "non volatile".

Signed and Sealed this
Fourteenth Day of June, 2016

Michelle K. Lee
*Director of the United States Patent and Trademark Office*